United States Patent [19]

Higuchi et al.

[11] Patent Number: 5,132,808
[45] Date of Patent: Jul. 21, 1992

[54] IMAGE RECORDING APPARATUS

[75] Inventors: Hirokazu Higuchi, Yokohama; Kazuo Kashiwagi, Tokyo, both of Japan

[73] Assignee: Canon Kabushiki Kaisha, Tokyo, Japan

[21] Appl. No.: 426,271

[22] Filed: Oct. 25, 1989

[30] Foreign Application Priority Data

Oct. 28, 1988 [JP] Japan .................. 63-270948
Dec. 15, 1988 [JP] Japan .................. 63-315036
Dec. 16, 1988 [JP] Japan .................. 63-318028
Dec. 16, 1988 [JP] Japan .................. 63-318029

[51] Int. Cl.$^5$ .............................. H04N 1/00
[52] U.S. Cl. .................. 358/403; 358/444; 358/488; 358/496; 235/454
[58] Field of Search ........... 358/293, 296, 403, 488, 358/496, 404, 444; 235/375

[56] References Cited

U.S. PATENT DOCUMENTS 3,988,571 10/1976 Blair ........................ 235/61.9 R
4,283,621 8/1981 Pembroke .................. 235/375
4,577,956 3/1986 Klosterhuber et al. ...... 355/40
4,819,034 4/1989 Weinzierl et al. .......... 355/41
4,920,427 4/1990 Hirata ...................... 358/437

FOREIGN PATENT DOCUMENTS 2134891 2/1973 Fed. Rep. of Germany .
2523112 12/1975 Fed. Rep. of Germany .
3028104 2/1982 Fed. Rep. of Germany .
3220977 12/1983 Fed. Rep. of Germany .

Primary Examiner—Edward L. Coles, Sr.
Attorney, Agent, or Firm—Fitzpatrick, Cella, Harper & Scinto

[57] ABSTRACT

An image recording apparatus for recording the images of originals on a recording medium is provided with a reading device for reading information for discriminating between originals, a recording device for recording the images of the originals on the recording medium, a conveying device for conveying the orginals to the reading means and the recording means, a detector for detecting the state of conveyance of the originals conveyed by the conveying means, a data preparing device for preparing index data on the basis of the information read by the reading means, and a controller for controlling the preparation of the data by the data preparing means in conformity with the state of conveyance of the originals detected by the detector.

19 Claims, 18 Drawing Sheets

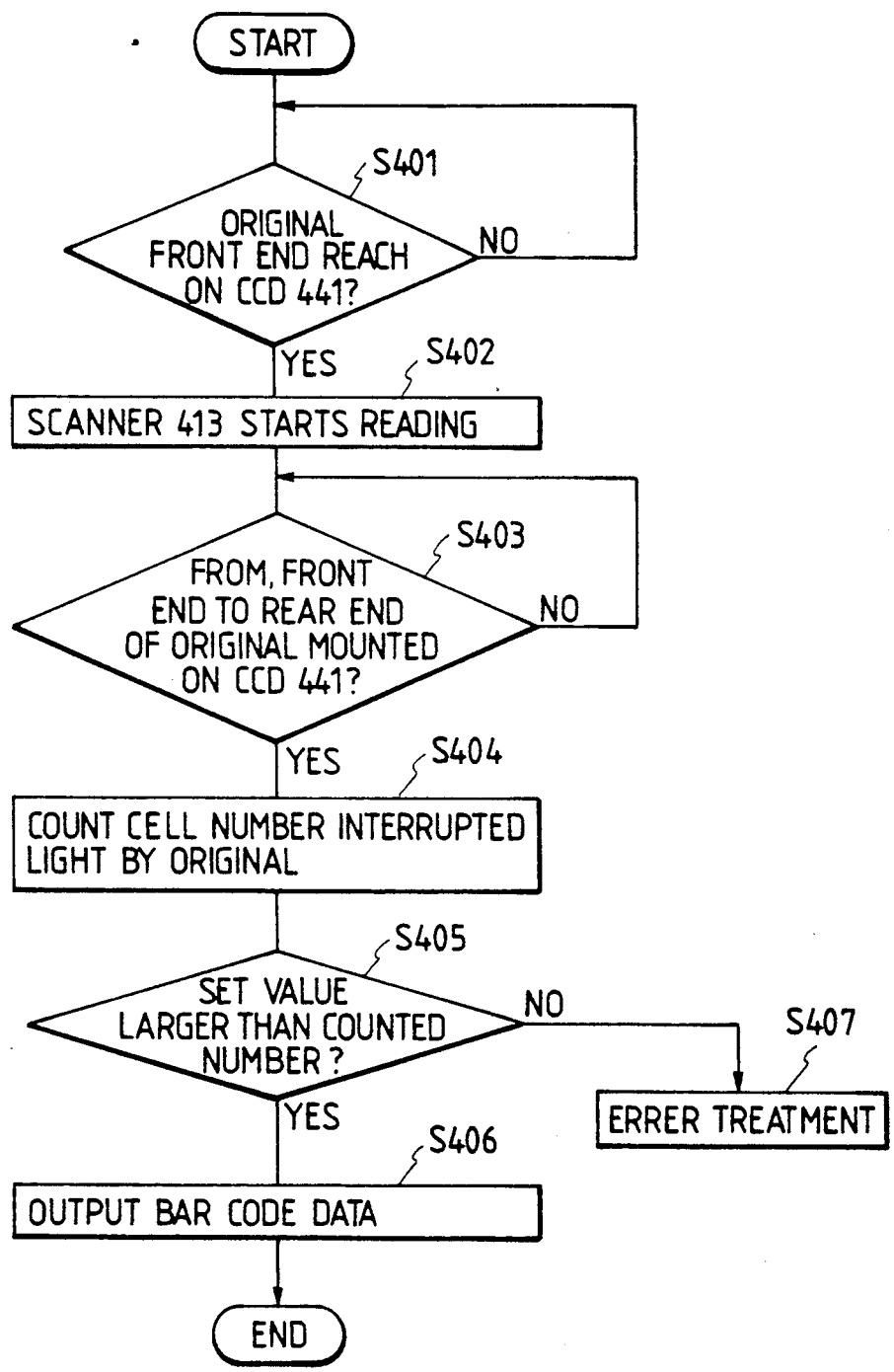

IMAGE RECORDING APPARATUS

BACKGROUND OF THE INVENTION

1. Field of the Invention

This invention relates to an image recording apparatus which can record on a recording medium originals given information such as bar codes for discriminating between the originals and can also read such information.

2. Related Background Art

Heretofore, in order to curtail the custody space for originals such as slips produced in great quantity, it has been possible to record the images of the originals on a microfilm, an optical disk, a magnetic disk or the like. To make these images readily accessible in the future, it is necessary to input index data corresponding to the respective images, but the work of inputting such index data has heretofore consumed enormous time. So, as a means for solving this problem, there is known an apparatus for giving originals code information to provide index data, reading such code information by a machine (a bar code scanner, MICR, OCR or the like) and also recording the images on the originals.

This apparatus is designed to give, in advance, code information for discriminating between originals to originals to be photographed, continuously feed the originals into a conveyance path, and successively read the code information using reading means disposed in the conveyance path. The output signals of the read information are accumulated as index data, for example, in a memory device provided in an outside instrument such as a personal computer.

On the other hand, the images of the originals whose code information has been read are successively fed into a photographing apparatus, where they are continuously photographed on a microfilm. The address numbers (frame numbers) of the images recorded on the microfilm, together with the code information read as the index data, are accumulated in the memory device of the outside instrument.

However, in the case of the above-described prior art, the code information read by the reading means is sequentially output to the personal computer or the like, and this has led to the disadvantage that when an inconvenience such as the jam of an original or the feeding of two or more originals in a superposed relationship occurs, it is necessary to carry out the process of eliminating the jam of the original and also carry out the restoration process of correcting or invalidating the index data accumulated in the outside instrument such as the personal computer.

Particularly, when the number of originals is large, the index data accumulated in the memory device are also numerous and it has been very cumbersome to correct such data after photographing is finished.

SUMMARY OF THE INVENTION

The present invention has been made to solve the above-noted problems peculiar to the prior art and an object thereof is to provide an image recording apparatus which can easily accomplish the correction of index data when a conveyance abnormality occurs, such as a double or sequence feed condition in which two or more originals are fed with most portions thereof superposed one upon another, a sequence feed condition in which originals are fed with portions thereof superposed one upon another, or a jam condition in which an original is jammed in a path.

Another object of the present invention is to provide an image recording apparatus which is easy to operate and simplified in construction as well as reduced in cost.

BRIEF DESCRIPTION OF THE DRAWINGS

FIG. 22 is a flow chart showing the operation control of the embodiment of FIG. 21.

DESCRIPTION OF THE PREFERRED EMBODIMENTS

Some preferred embodiments of the present invention will hereinafter be described.

Figure 1:
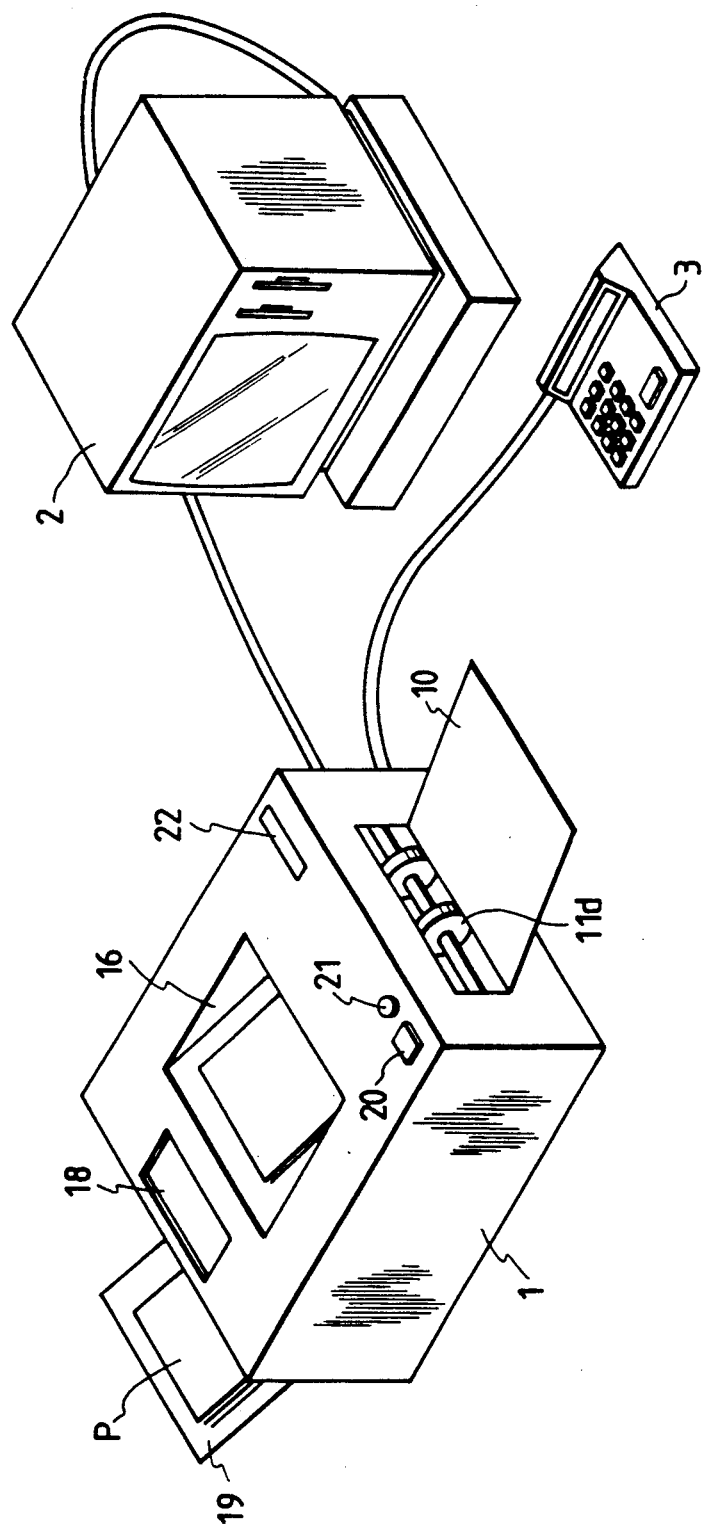
FIG. 1 is a perspective view showing the external appearance of a first embodiment of an image recording apparatus according to the present invention.
Figure 2:
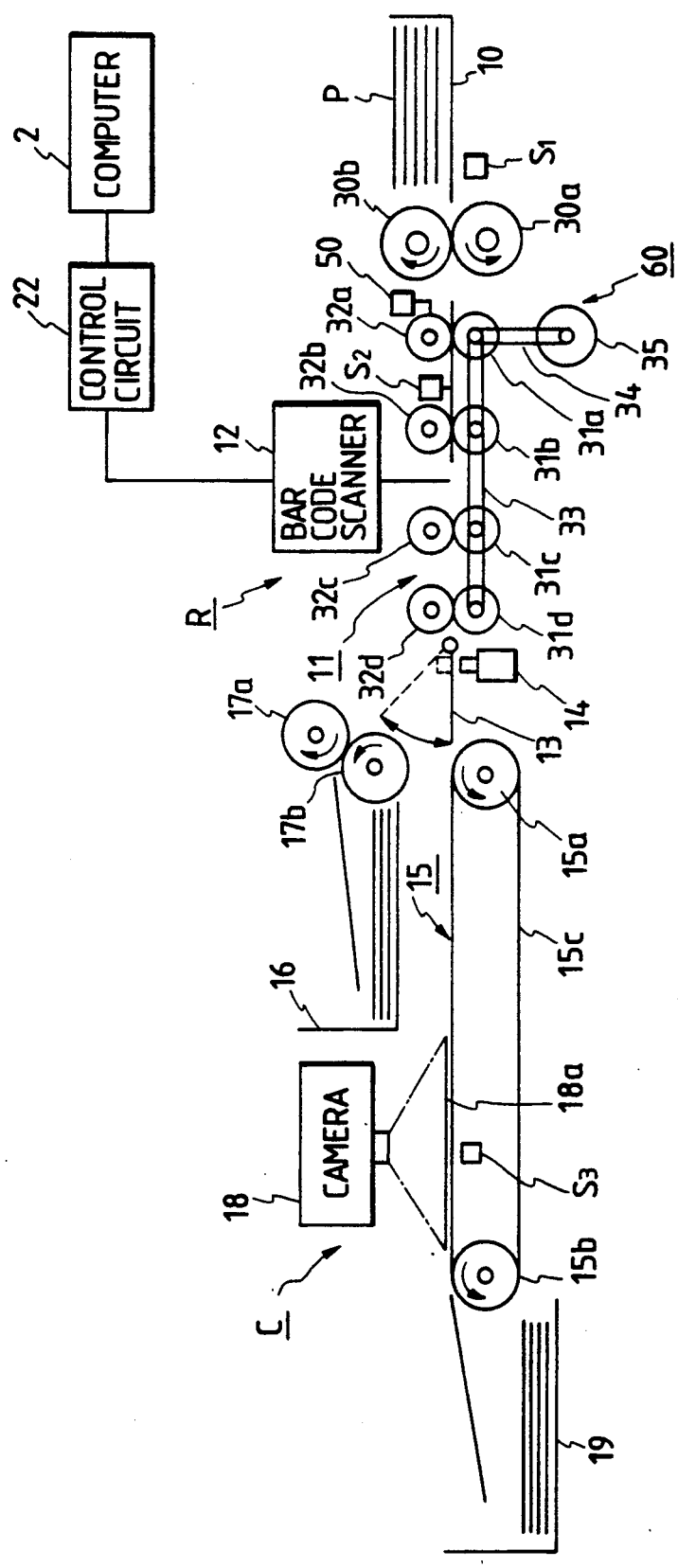
FIG. 2 is a longitudinal cross-sectional view schematically showing the construction of the body of the apparatus of the same embodiment.

FIG. 1 shows the external appearance of an image recording apparatus according to a first embodiment of the present invention, and FIG. 2 schematically shows the construction of the apparatus body. The apparatus of the present embodiment is comprised of the apparatus body 1 provided with a recording unit C and a reading unit R therein, a computer 2 having memory means for memorizing the code information of an object P to be photographed as an original read by the reading unit R, and a key inputting portion 3 as inputting means for inputting index data.

In FIGS. 1 and 2, a paper supply tray 10 for supporting thereon objects P to be photographed such as slips is provided on this side of the apparatus body 1, and a sensor $S_1$ for detecting the presence of the objects P to be photographed is provided below the paper supply tray 10.

A straight conveyance path is provided within the apparatus body 1, and the reading unit R and the recording unit C are provided on this conveyance path in succession from the entrance side. The conveyance path is divided into a reading side 11 and a recording side 15, and a guide plate 13 as separating means for separating the objects P to be photographed into two directions is provided between the conveyance paths 11 and 15. By this guide plate 13 being pivotally moved, the objects P to be photographed may be directed to either the recording unit C or a reject tray 16 provided above the recording unit C.

Feed rollers 30a and 30b for conveying the objects P to be photographed piled on the paper supply tray 10 one by one from below are provided at the entrance side of the conveyance path 11 which is adjacent to the reading unit R. A plurality of pairs of rollers 31a; 32a, 31a; 32b, 31c; 32c and 31d; 32d are disposed in the conveyance path 11 on the reading side along the direction of conveyance. Of these pairs of rollers, the rollers 31a, 31b, 31c and 31d on the driving side are driven by a belt 33, and the rollers 32a, 32b, 32c and 32d are adapted to follow the rotation of the rollers 31a, 31b, 31c and 31d while being in contact therewith.

A bar code scanner 12, such as reading means for reading bar codes attached to the objects P to be photographed which are coded information for discriminating between originals, is provided above the conveyance path 11 on the reading unit R side, and a sensor $S_2$ for detecting the presence of the objects P to be photographed is provided between the rollers 31a and 31b.

On the other hand, the driven side roller 32a disposed at the entrance side of the conveyance path is upwardly movable, and from the amount of movement of this roller, the thickness of the object P to be photographed may be detected to thereby judge whether the feed condition is the double feed condition.

Figure 4:
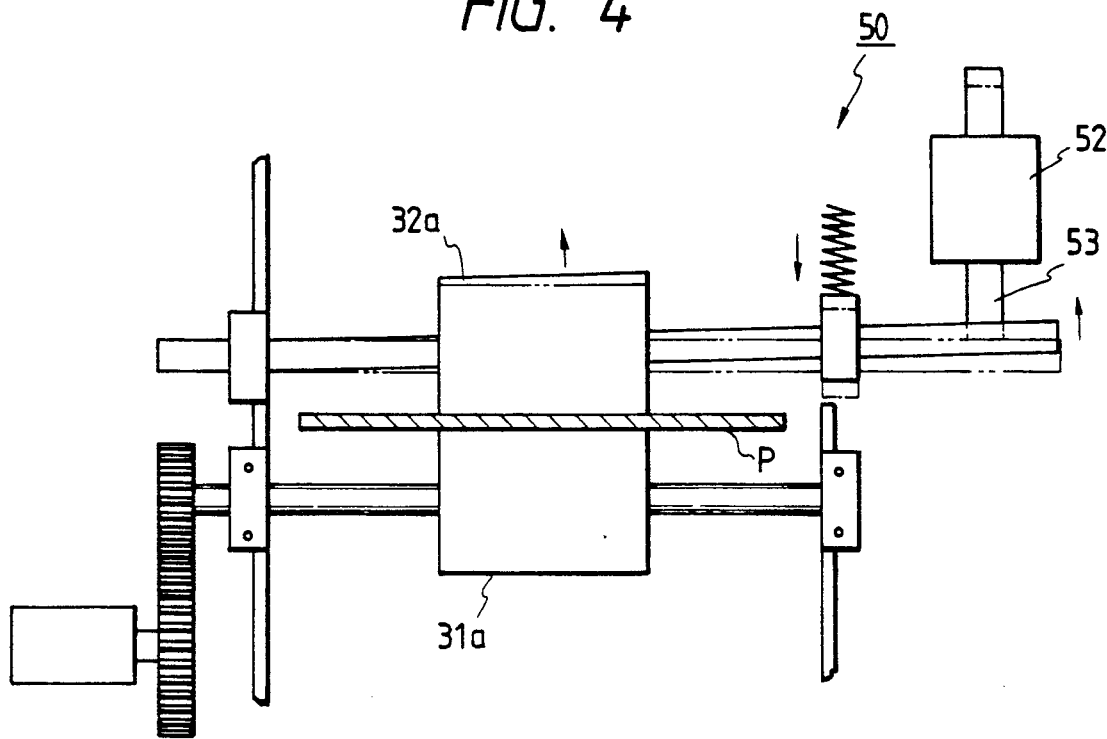
FIG. 4 is a schematic front view showing an example of the double feed detecting means of FIG. 2.

FIG. 4 schematically shows the construction of double feed detecting means 50 for detecting the double feed condition. That is, one roller end 51 of the driven side roller 32a is vertically movable, and this roller end 51 bears against the end of the shaft 53 of a differential transformer 52. Thus, when the first object P to be photographed comes into between the rollers 31a and 32a, the driven side roller 32a is vertically moved, whereby the shaft 53 of the differential transformer 52 is pushed up. In order to put out an output conforming to this amount of movement, the differential transformer 52 uses this output as a reference, and is adapted to judge on the basis of this value whether the objects P to be photographed thereafter are being double-fed.

The double feed detecting means 50 is not limited to such a type which detects the thickness of the object P to be photographed, but may also adopt other system.

Sequence feed detecting means 60 for detecting the sequence feed condition of the objects P to be photographed is also provided in the conveyance path 11 on the reading unit R side. In this embodiment, the sequence feed detecting means 60 is comprised of a sensor $S_2$ for detecting the objects P to be photographed, and an encoder 35 for detecting the number of rotations of the driving side roller 31a. The encoder 35 is connected to the driving side roller 31a through a belt 34, and pulses output from the encoder 35 while an object P to be photographed passes on the sensor $S_2$ are counted, and the length of the object P to be photographed is detected from the count value, whereby the sequence feed condition is judged when the length of the object P to be photographed is greater than a predetermined length.

This sequence feed detecting means is neither limited to such a type, but may adopt other system.

Figure 5:
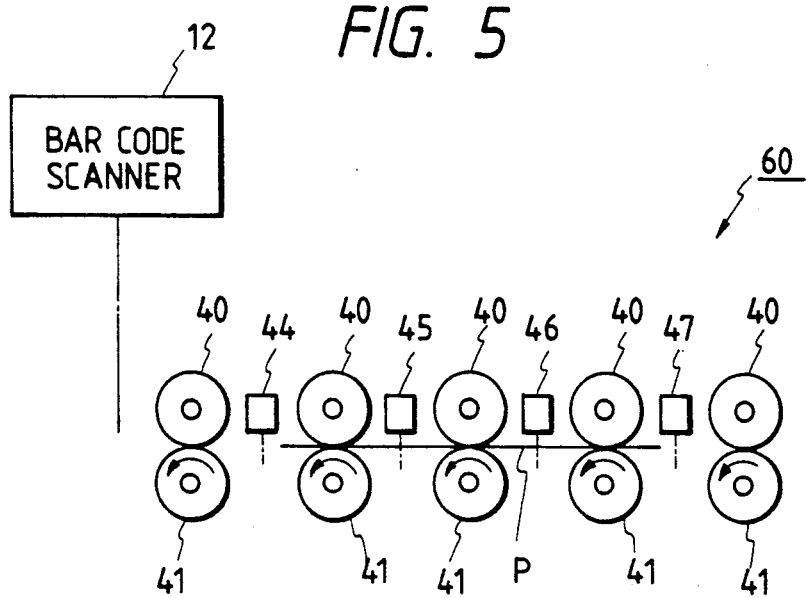
FIG. 5 is a side view schematically showing the construction of the sequence feed detecting means of FIG. 2.

FIG. 5 shows another form of the sequence feed detecting means. In this case, a plurality of roller pairs 42 each comprising a pair of lower driving roller 41 and upper driven roller 40 are disposed in the direction of conveyance, and sensors 44, 45, 46 and 47 are provided between the adjacent roller pairs 42. Depending on whether one of the sensors 44, 45, 46 and 47 is ON when an object P to be photographed has passed the sensors, the length of the object P to be photographed is detected, and with that value as the standard, the sequence feed condition is judged when the length of the subsequent object P to be photographed is greater than a predetermined length.

Also, conveyor means comprising a pair of rollers 15a and 15b and a belt 15c passed over these rollers is provided in the conveyance path 15 on the recording unit C side, and a camera 18 for photographing is disposed above the belt 15c. A discharge tray 19 for supporting the photographed objects P thereon is provided downstream of the belt 15c with respect to the direction of conveyance.

A jam detecting sensor $S_3$ for detecting the jammed state of the objects P to be photographed is provided in the conveyance path 15 on the recording unit C side, and is designed to judge that jam of an object P to be photographed has occurred, if the sensor $S_3$ does not become ON even when a predetermined time has elapsed from a point of time whereat the bar code has been read by the bar code scanner 12. In this embodiment, the jam detecting sensor $S_3$ is disposed at the photographing position in the recording unit C, and jam is judged when an object P to be photographed whose bar code information has been read does not come to the photographing position within a predetermined time.

As shown in FIG. 1, a switch 20 for effecting only the photographing of the objects P to be photographed (hereinafter referred to as the "photography only sw 20") and an alarm lamp 21 to be described are provided on the upper surface of the apparatus body 1.

Figure 3:
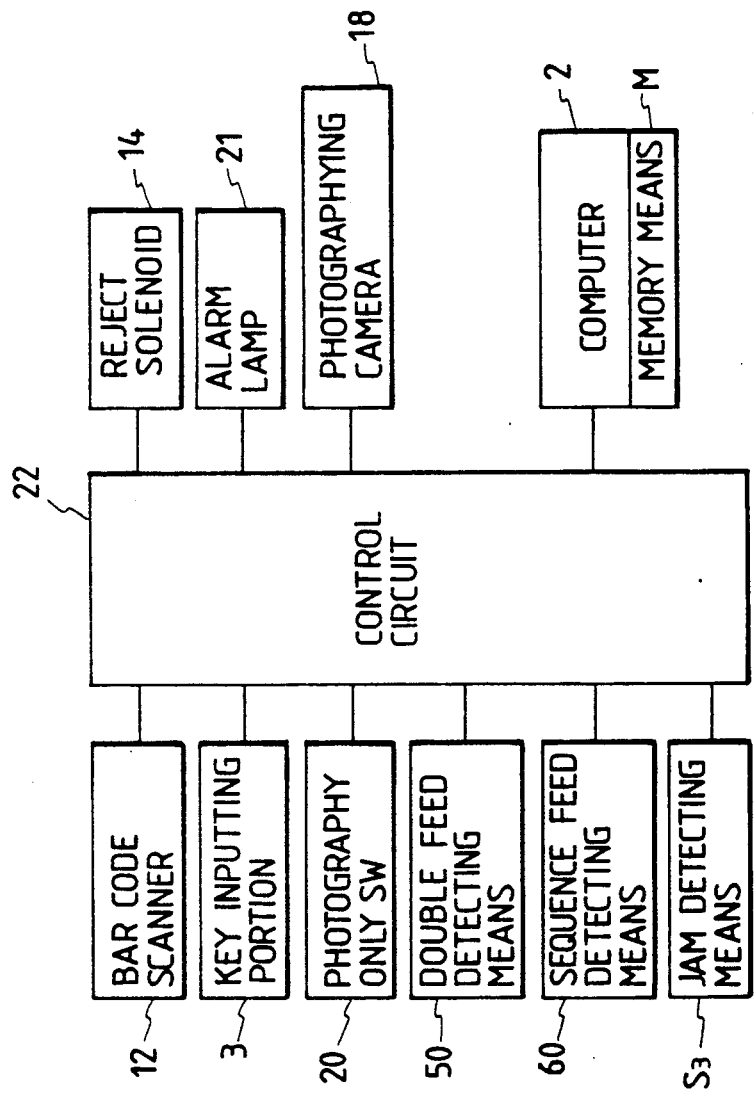
FIG. 3 is a block diagram showing the main control system in the same embodiment.

FIG. 3 shows the circuit construction of a control system in the present embodiment. As shown in FIG. 3, the bar code scanner 12, the reject solenoid 14, the photographing camera 18, the photography only sw 20, the alarm lamp 21, the jam detecting sensor $S_3$, the double feed detecting means 50 and the sequence feed detecting means 60 of the apparatus body 1 are connected to a control circuit 22 such as a CPU provided within the apparatus body, and the key inputting portion 3 is also connected to this control circuit 22. This control circuit 22 is connected to a computer 2 having memory means M comprising a floppy disk or a magnetic tape or the like, and the code information of the object P to be photographed read by the bar code scanner 12 is stored in the memory means M. This control circuit 22 also performs the function as information correcting means for correcting index data including the code information stored in the memory means M of the computer 2, in conformity with the conveyed condition of the objects P to be photographed.

Conveyance abnormality such as the double feed condition, the sequence feed condition or jam of the objects P to be photographed is adapted to be detected by the double feed detecting means 50, the sequence feed detecting means 60 or the jam detecting sensor S₃, and the control circuit 22 transfers a signal for correcting the index data or invalidating the stored data to the computer 2 when conveyance abnormality is detected.

Figure 6:
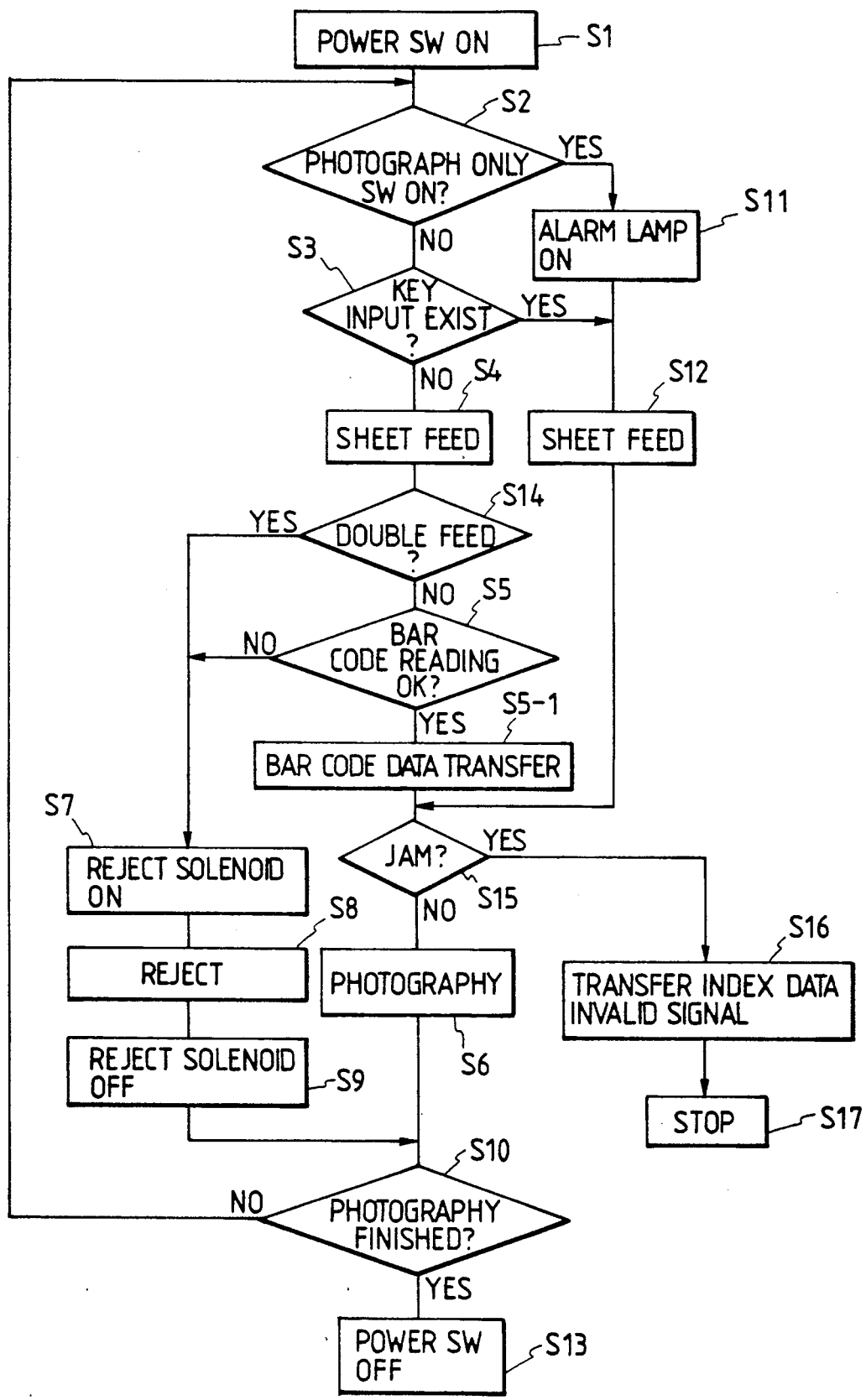
FIG. 6 is a flow chart showing the procedures of photographing, etc. in the same embodiment.

The operation of the present embodiment will now be described with reference to the flow chart of FIG. 6. This flow chart shows a mode in which after an object P to be photographed is photographed, the next object P to be photographed is fed.

First, when the operator is to photograph an object P to be photographed given a bar code, he closes the power source switch (step 1), whereafter he effects the feeding of the object P to be photographed without depressing the photography only sw 20 and without effecting key inputting (steps 2-4). Thereupon, the bar code is read by the bar code scanner 12, and the read data of the bar code and index data comprising the address number (frame number) when this object P to be photographed is recorded on a microfilm are successively input to the memory means M (step 5 - 1).

The object P to be photographed whose bar code has been read passes the conveyance path 11 on the reading unit R side, the guide plate 13 and the conveyance path 15 on the recording unit C side and is photographed on the microfilm by the photographing camera 18 (step 6). On the other hand, when the bar code of the object P to be photographed has not been read (step 5), the reject solenoid 14 is energized and the guide plate 13 is pivotally moved to thereby guide the object P to be photographed to the reject tray 16 (steps 7 and 8), and then the reject solenoid 14 is deenergized (step 9) and the guide plate 13 is returned to its original state. Then, the operation of steps 1-9 is effected until the objects P to be photographed become absent on the paper supply tray 10 (step 10).

When the double feed of the objects P to be photographed fed by the feed rollers 30a and 30b occurs, the double feed condition is detected by the double feed detecting means 50 (step 14) before the reading of the bar code is effected, and the reject solenoid 14 is energized without the reading of the bar code being not effected, and the guide plate 13 is pivotally moved and the object P to be photographed is guided to the reject tray 16 (steps 7 and 8). Subsequently, the reject solenoid 14 is deenergized (step 9) and the guide plate 13 is returned to its original state, and photographic recording is done until the objects P to be photographed on the paper supply tray 10 become absent (steps 1-10).

Also, if the object P to be photographed is not detected by the jam detecting sensor S₃ and jam is judged before a predetermined time elapses after the bar code of the object P to be photographed has been read by the bar code scanner 12, an invalid signal for invalidating the bar code data regarding the object P to be photographed whose jam has been judged and the memory data comprising an address number is transferred from the control means 22 to the computer 22 to thereby stop the apparatus (steps 15-17). By the invalid signal, only the index data stored in the memory means M which corresponds to the object to be photographed judged as conveyance abnormality is erased. Then, after the jam of the object P to be photographed is treated, the photographing operation is resumed and continued until the objects P to be photographed become absent on the paper supply tray 10 (step 10).

When the photographing of a rejected object P to be photographed is to be effected, the photography only sw 20 is not closed (step 2), and the resupply of the object P to be photographed is effected while predetermined index data is input by the key inputting portion 3 (steps 3 and 12). In this case, the reading by the bar code scanner 12 is not effected and therefore, the object P to be photographed is photographed without being rejected (steps 6 and 10), and the photographing of all objects P to be photographed can be finished safely (step 13). Also, thus, with regard to the objects P to be photographed which are not given bar codes, the preparation of index data becomes possible by inputting the index data from the key inputting portion 3, without such objects to be photographed being rejected.

Further, when only photographing is to be effected without any index, the operator closes the power source switch (step 1), and then closes the photography only sw 20 (step 2). Thereupon, the alarm lamp 21 is turned on (step 11) and paper supply is effected (step 12), and the photographing of the objects P to be photographed can be completed without effecting the reading of bar codes (steps 6, 10 and 11). The reason why in this case, the alarm lamp 21 is turned on by closing the photography only sw 20 is that if an object P to be photographed given a bar code is supplied by mistake with this switch 20 remaining closed, photographing may be finished without index data in spite of the bar code being given and the operator may not be aware of that fact.

Figure 7:
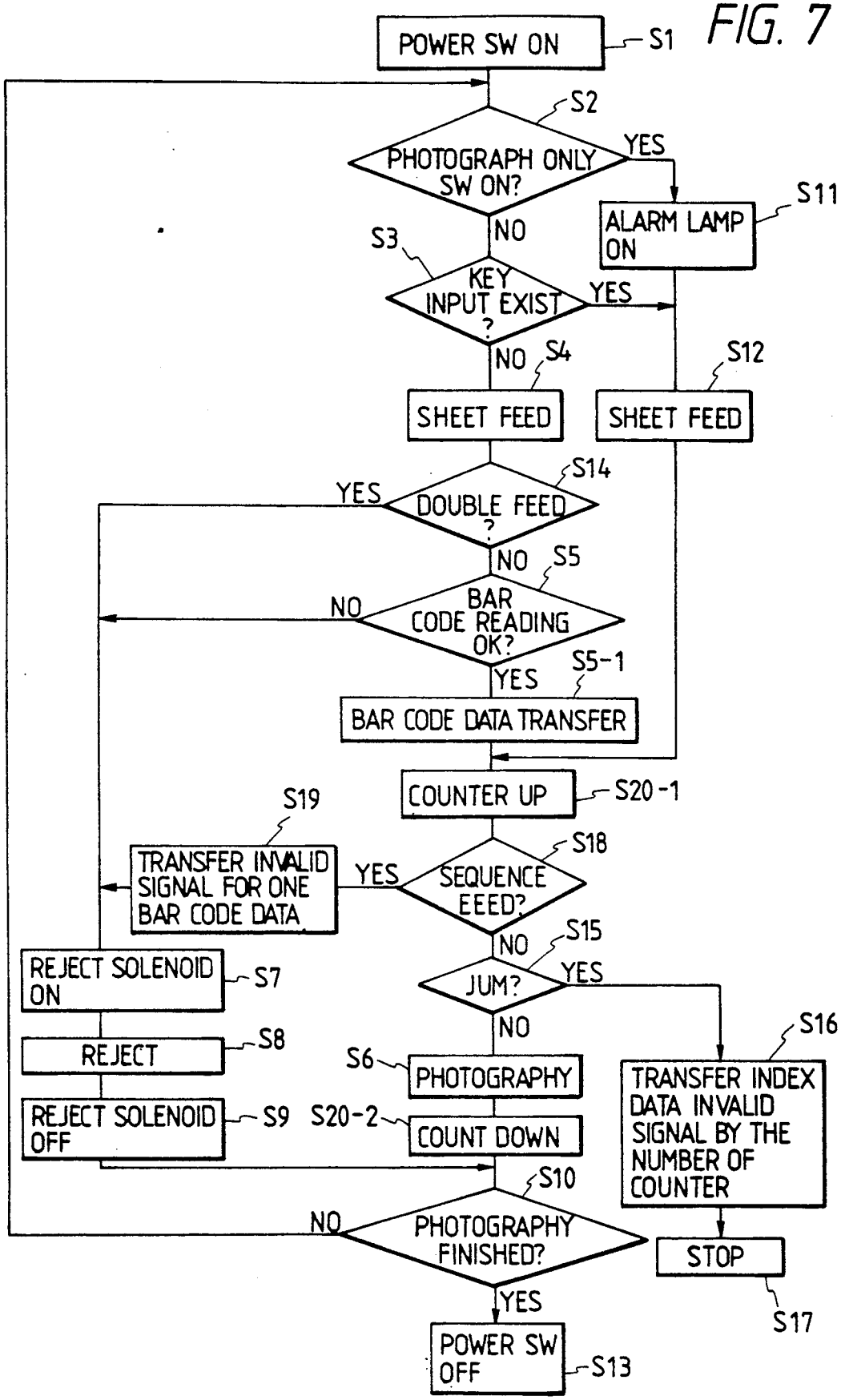
FIG. 7 is a flow chart showing the procedures of photographing, etc. in the case of the continuous sheet feed mode in the same embodiment.

FIG. 7 shows a flow chart in the case of the continuously supply mode in which before the photographing of an object P to be photographed is finished, objects P to be photographed are supplied one after another at predetermined intervals, and in such case, a plurality of objects P to be photographed exist on the conveyance path. In such case, the sequence feed condition in which two or more objects P to be photographed are fed flying in a row poses a problem.

This flow chart is the same as the flow chart of FIG. 6 except for the sequence feed condition and the jam treatment and therefore, description will be made only of the case where the sequence feed condition is detected and the case of jam treatment.

In the case of the sequence feed condition, the bar code of the preceding object P to be photographed is read and the index data thereof is stored in the memory means M and therefore, when sequence feed is detected, the invalid signal of the bar code data is transferred to the computer 2 (steps 18 and 19) and also the reject solenoid 14 is energized, and the objects to be photographed are rejected to the reject tray 16 through the guide plate 13 (steps 7-9). By said invalid signal, the index data in the memory means comprising the bar code and the address number which corresponds to the sequence-fed objects to be photographed is erased.

Also, when objects P to be photographed are jammed, a plurality of objects P to be photographed stagnate on the conveyance path in this continuous feed mode. Bar code information, when read by the bar code scanner 12, is sequentially transferred to the computer 2 (step 5 - 1) and therefore, the stored data of all of the jammed objects P to be photographed need be corrected.

So, in this flow chart, after the bar code of a certain object P to be photographed is read and the data thereof is transferred to the computer 2, the counter is counted up (step 20 - 1), and when this object P to be photographed is photographed in the recording unit C, the counter is counted down (step 20 - 2), and always the bar code is read on the conveyance path and the number of the unphotographed objects P to be photographed is counted. In this embodiment, the timing of the count down is taken at a point of time whereat the photographing of an object P to be photographed has been finished, for example, by the object to be photographed being exposed on the film and the shutter of the camera being closed.

When an object P to be photographed is jammed, a signal for invalidating the bar code data by the number of the counter is transferred from the control circuit 22 to the computer 2 (step 16), whereafter the apparatus is stopped (step 17).

The above-described embodiment is designed such that during double feed, the bar code is not read but rejected, but where the detection of double feed is effected after the reading, design may be made such that as in the case of sequence feed, the signal for invalidating the bar code data is transferred to the computer 2. If a construction in which the code information is not read is adopted, the apparatus can be simplified in construction because any excess signal is not send to the computer 2.

Figure 8:
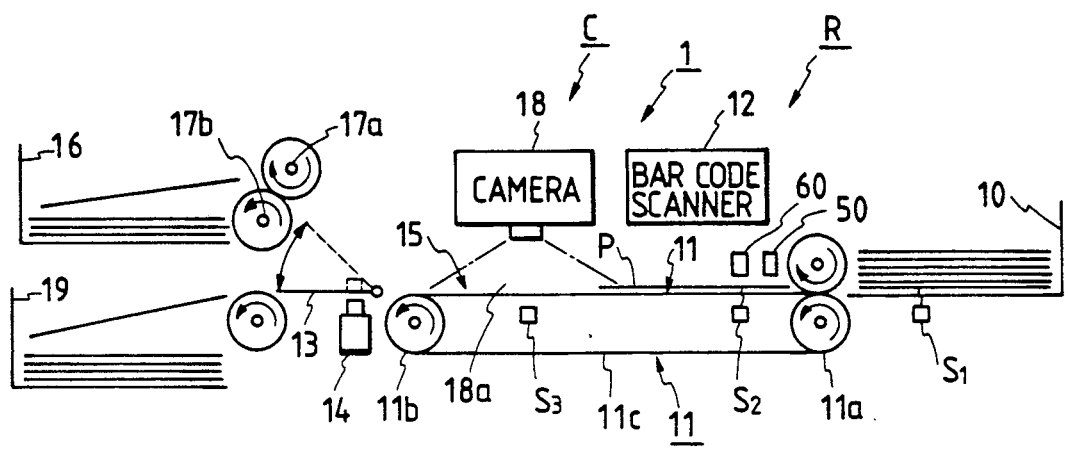
FIG. 8 is a longitudinal cross-sectional view schematically showing the construction of an image recording apparatus according to a second embodiment of the present invention.

FIG. 8 shows a second embodiment of the image recording apparatus according to the present invention, and in this embodiment, portions identical to those in the previous embodiment are given similar reference characters. In the present embodiment, the reject portion (the guide plate 13 and the reject solenoid 14) is provided downstream of the photographing camera 18 with respect to the direction of conveyance of the objects to be photographed. The photographing operation is performed in the procedure shown in FIG. 6, as in the previous embodiment. That is, again in the present embodiment, the state of conveyance of the objects P to be photographed is detected by the double feed detecting means 50, the sequence feed 15 detecting means 60 and the jam detecting sensor S₃, and the bar codes are read by the bar code scanner 12 and the code data stored in the memory means are corrected. In the case of the double feed condition and the sequence feed condition, photographing is not effected and the objects to be photographed are rejected, but the positional relation between the recording unit C and the reject portion poses no problem. If the reject portion is thus provided downstream of the recording unit, the trays 16 and 19 can be disposed in superposed relationship with each other and the construction of the apparatus can be made compact.

In the foregoing, description has been made with respect to an apparatus using bar codes and a microfilm camera, whereas the present invention is not restricted thereto, but adoption may be made of a construction using, instead of bar codes, other information which can be read by a machine such as OCR or MICR, and the recording means is neither limited to the means for effecting recording on a microfilm, but use may be made of means for reading the image of the object to be photographed by an image sensor such as a CCD and recording the image signal on a recording medium such as an optical disk or a magnetic tape, or means for effecting the recording of images by the electrophotographic system.

In the above-described embodiments, the state of conveyance of the originals such as double feed, sequence feed or jam is detected by the detecting means and the index data stored in the memory means are successively corrected by the information correcting means and therefore, it becomes unnecessary to correct the index data after reading and recording and thus, the correcting work becomes easy and the efficiency of work can be improved. Also, the read information is sequentially transferred to the memory means and therefore, any extra intermediate memory is unnecessary and the construction of the apparatus can be simplified.

Figure 9A:
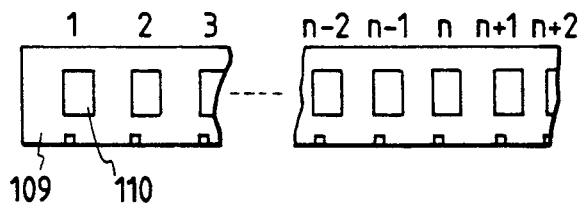
FIGS. 9A and 9B illustrate the relation between the image frames of a microfilm and index data.
Figure 9B:
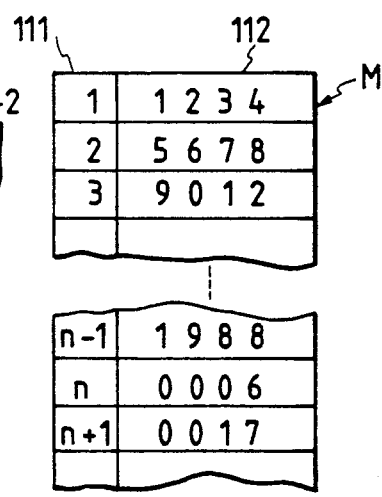

FIGS. 9A and 9B show a microfilm 109 on which the images of objects to be photographed are recorded and the contents of the memory means storing index data therein, respectively, and the address number (frame number) 111 of each image frame 110 of the microfilm and the code information (bar code data) 12 of the images are stored as index data in the memory means M. The index data comprising the address number and code information corresponding to an object to be photographed which has caused conveyance abnormality are erased by an invalid signal.

Figure 10:
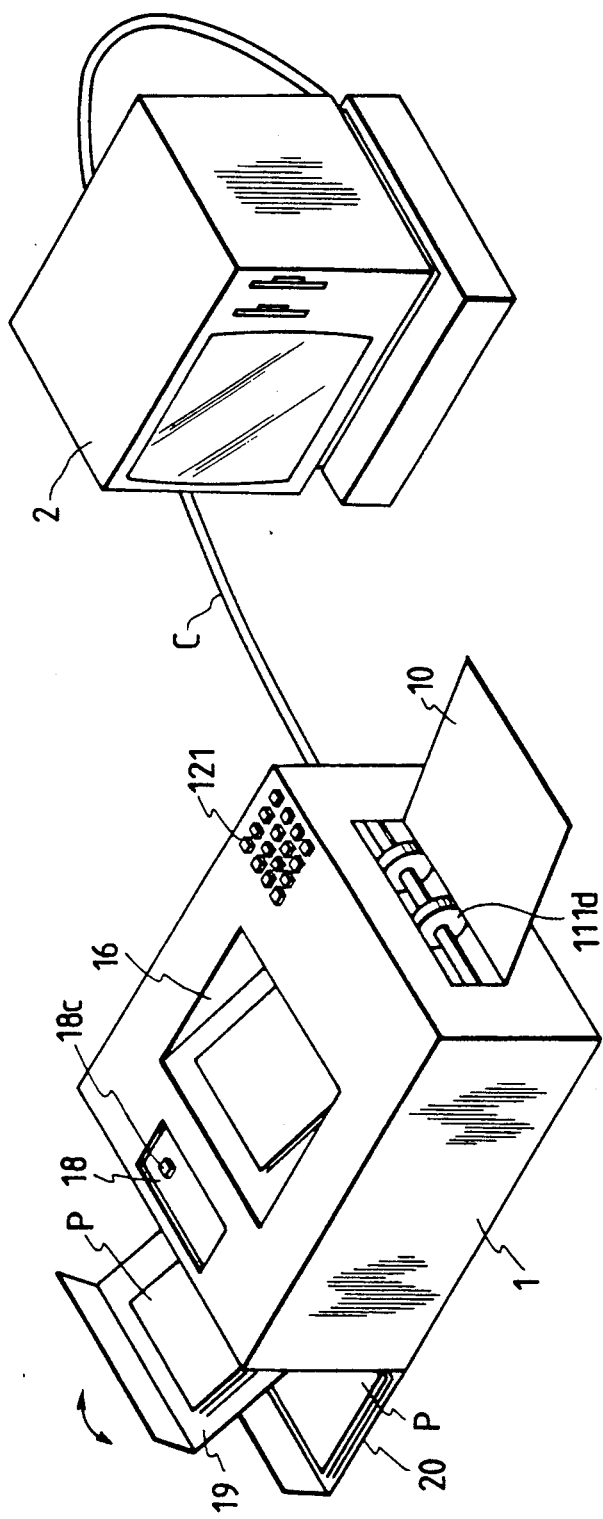
FIG. 10 is a perspective view showing the external appearance of another embodiment of the image recording apparatus of the present invention, the apparatus being connected to a computer.
Figure 11:
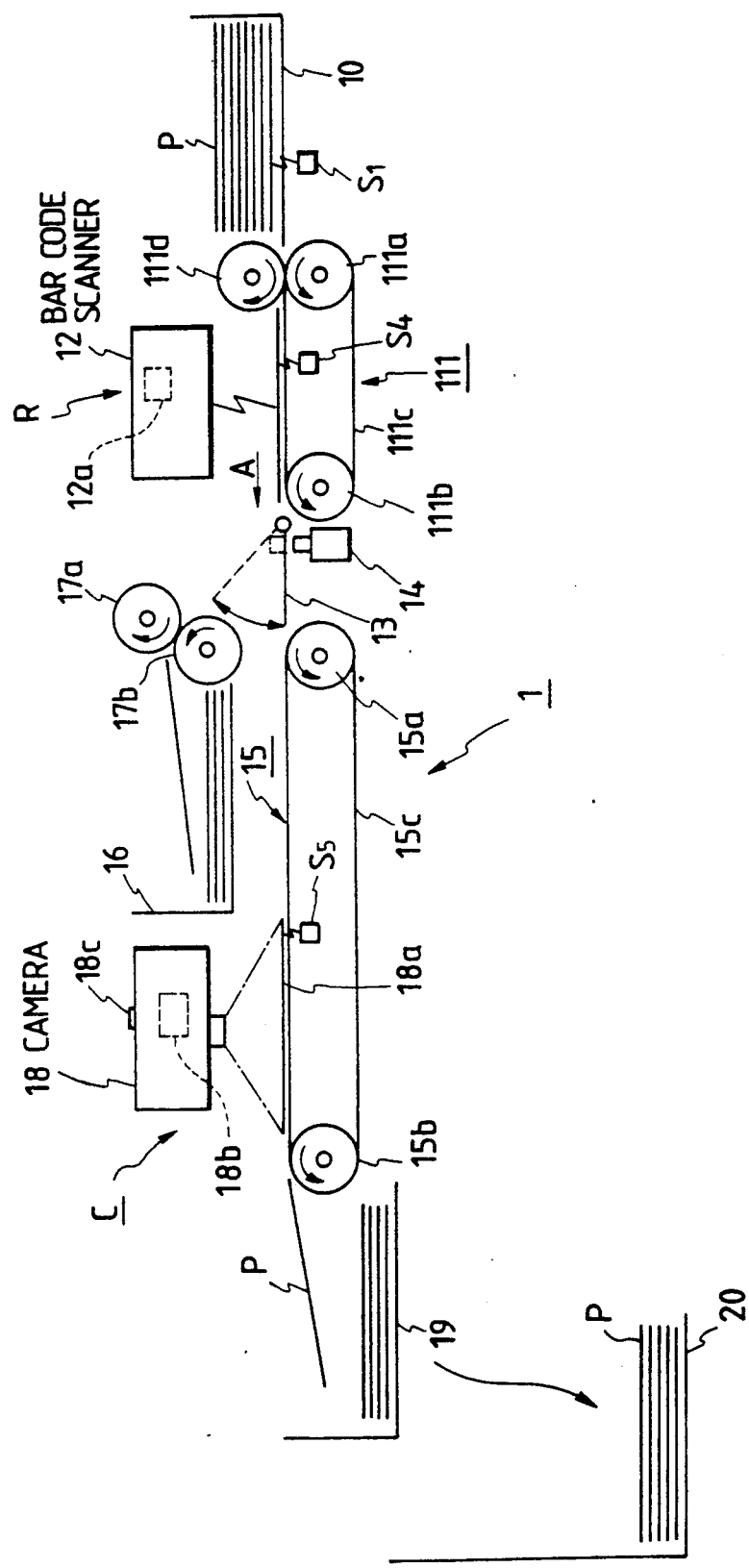
FIG. 11 is a longitudinal cross-sectional view schematically showing the embodiment of FIG. 10.

FIG. 10 shows another embodiment of the present invention, and in this embodiment, elements functionally similar to those in the previous embodiments are designated by identical reference characters. FIG. 11 schematically shows the construction of the body 1 of the image recording apparatus.

Referring to FIGS. 10 and 11, a paper supply tray 10 for supporting objects P to be photographed such as slips thereon is provided on this side of the body 1, and a sensor S₁ for detecting the presence or absence of the objects P to be photographed is provided below the paper supply tray 10. Conveying means 111 for conveying the objects P to be photographed on the tray 10 one by one from below in the direction of arrow A is disposed at a location adjacent to the paper supply tray 10, and this conveying means 111 comprises rollers 111a and 111b, a belt 111c passed over the rollers 111a and 111b, and a roller 111d which is in contact with the belt 111c at the position of the roller 111a. A bar code scanner 12 as reading means for reading bar codes (code information) attached to the objects P to be photographed is provided above the conveying means 111, and a sensor S₄ for detecting the presence of the objects P to be photographed on the belt 111c is provided between the rollers 111a and 111b.

A guide plate 13 pivotally movable to separate the objects P to be photographed into two directions is provided downstream of the conveying means 111 with respect to the direction of conveyance of the objects to be photographed, and this guide plate is adapted to be vertically driven by a reject solenoid 14. Thus, by this guide plate 13 being pivotally moved, the objects P to be photographed conveyed in the direction of arrow A are directed to conveying means 115 provided substantially at the same level as the conveying means 111 or to a reject tray 16 provided above the conveying means 115. The conveying means 115 comprises a pair of rollers 115a and 115b and a belt 115c passed over these rollers, and pull-in rollers 17a and 17b for pulling in the objects P to be photographed are provided between the reject tray 16 and the guide plate 13.

A photographing camera 18 as recording means for photographing the object P to be photographed in a photographing portion 18a on the belt 115c on a microfilm, not shown, is disposed at a location above the conveying means 115 and adjacent to the reject tray 16, and a sensor $S_5$ for detecting the presence of the object P to be photographed is provided below the photographing camera 18. Paper discharge trays 19 and 20 for supporting the photographed objects P thereon are disposed at two stages downstream of the conveying means 115 with respect to the direction of conveyance of the objects to be photographed, and of these trays, the upper paper discharge tray 19 is pivotable in the direction of arrow by a paper discharge tray driving mechanism, not shown. Thus, by this paper discharge tray 19 being pivotally moved, the objects P to be photographed supported on the tray 19 can be shifted onto the lower paper discharge tray 20.

As shown in FIG. 10, a key input portion 121 is provided on the upper portion of the body of the image recording apparatus. This key inputting portion 121 has a key for inputting a command as to whether an object P to be photographed should be rejected when the bar code attached thereto cannot be read, whether the bar code should be read as when only the photographing of an object P to be photographed having no bar code is effected, and whether the conveying means 111 and 115 should be started or stopped, and further includes a ten-key for manually inputting index data corresponding to the object P to be photographed. A counter 12a for bar codes as first counting means for counting the number of times of the reading of the bar codes of the objects P to be photographed is provided on the bar code scanner 12.

Also, a counter 18b for photographing as second counting means for counting the number of photographed objects P is provided in the photographing camera 18, and this counter 18b comprises a mechanical counter and is designed so as not to be cleared even when the power source is cut off. The counter 18b can arbitrarily clear the count value by a clear key 18c provided on the upper portion of the photographing camera 18.

Figure 12:
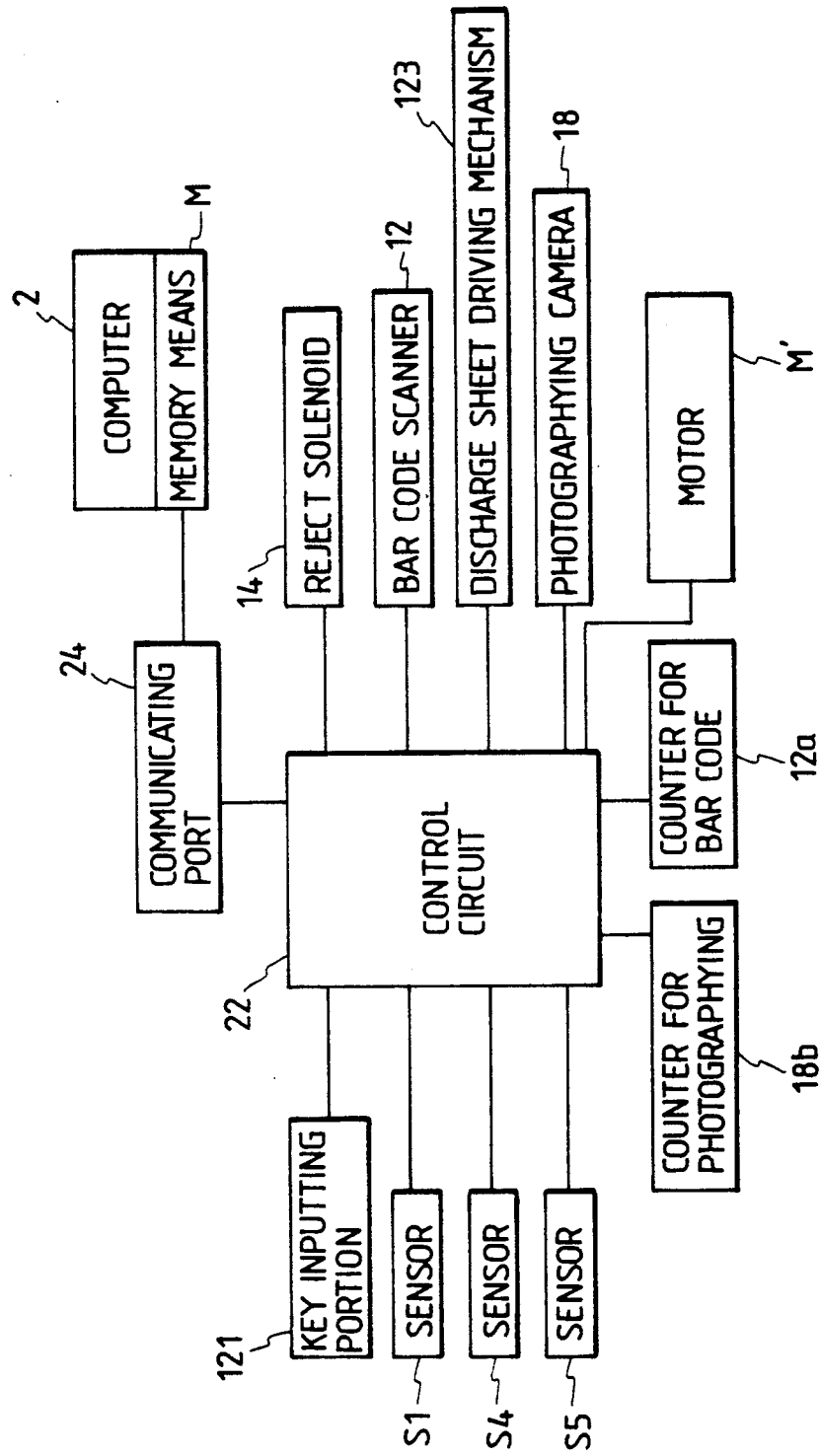
FIG. 12 is a block diagram showing the main control system in the embodiment of FIG. 10.

FIG. 12 is a block diagram showing the control system of the present embodiment. As shown in FIG. 12, the key inputting portion 121 and sensors $S_1$, $S_4$ and $S_5$ are connected to a control circuit 22 so that the operations of the various portions of the image forming apparatus may be controlled on the basis of information input from these. That is, a motor M' for driving the conveying means 111 and 115, the bar code scanner 12, the reject solenoid 14, the photographing camera 18 and a paper discharge tray driving mechanism 123 for pivotally moving the paper discharge tray 19 are connected to the control circuit 22 so that predetermined conveyance, reading, rejection, photographing and the operation of moving the objects to be photographed may be effected on the basis of the command from the key inputting portion 121. Also, the counter 12a and the counter 18b are connected to the control circuit 22. Thus, these counters 12a and 18b are operated on the basis of the signals from the sensors $S_4$ and $S_5$, and the information indicative of the number of times of the reading of bar codes and the number of times of photographing which is obtained by the counters 12a and 18b can also be input to the control circuit 22. Further, design is made such that the code information of the object P to be photographed obtained by the bar code scanner 12 is sent out to the computer 2 through a communication port 24 and a cable C.

Figure 13:
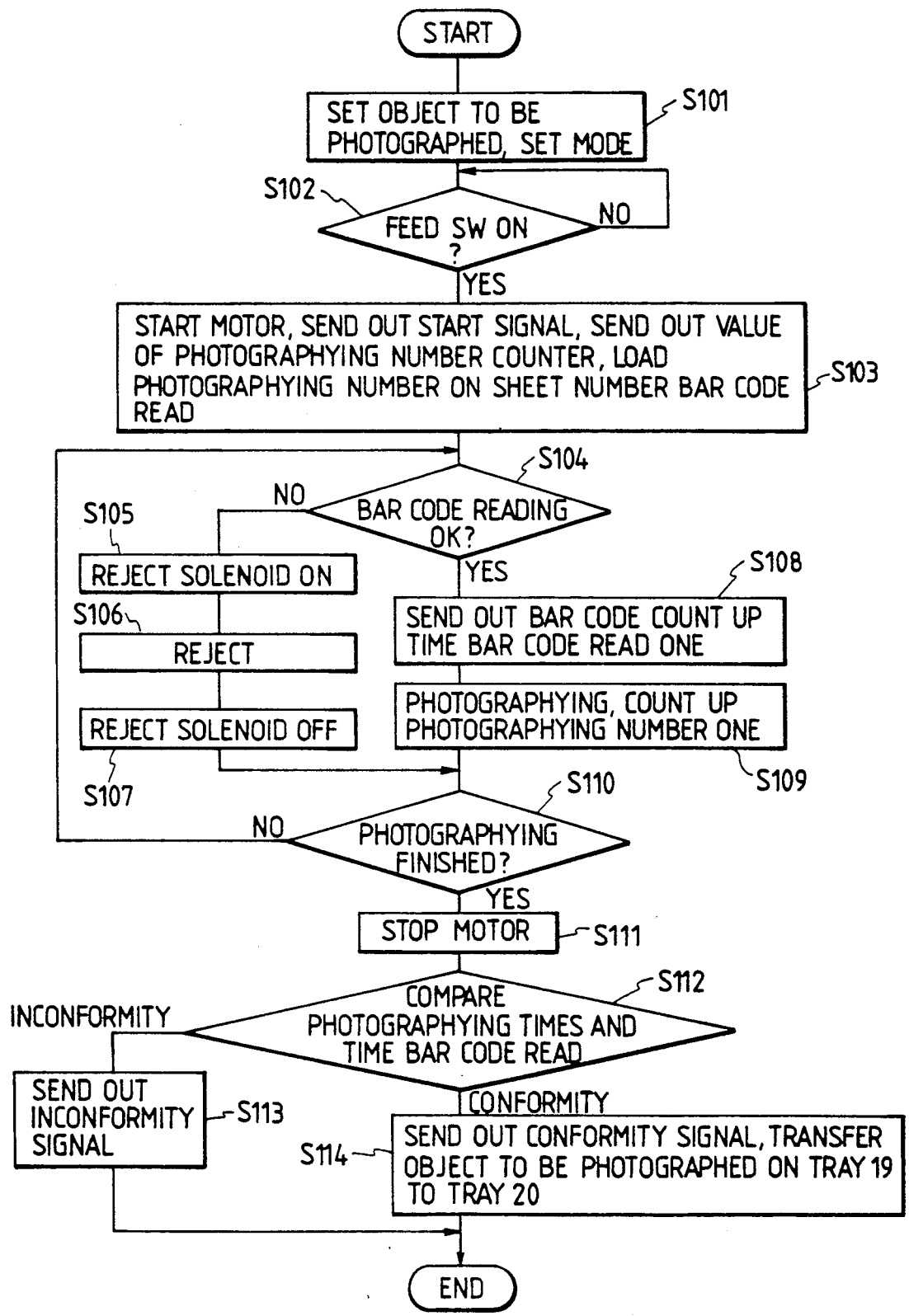
FIG. 13 is a flow chart showing the procedures of photographing, bar code reading, etc. in the embodiment of FIG. 10.

The operation of the present embodiment will now be described with reference to FIG. 13.

The apparatus of the present embodiment can select three modes, i.e., a mode 1 in which the object P to be photographed is rejected when the bar code thereof cannot be read, a mode 2 in which the object P to be photographed is not rejected but a signal to the effect that reading is impossible is sent out to the computer 2 when the bar code thereof cannot be read, and a mode 3 in which the reading of the bar code is not effected but simply the photographing of the object P to be photographed is effected, but the operation which is the gist of the present invention is generally common to these three modes and therefore, for the sake of convenience, the case of the mode 1 will hereinafter be described.

When image recording is to be effected, the operator first piles the objects P to be photographed on the paper supply tray 10, and operates the key of the key inputting portion 121 to thereby select the mode 1 (step 101). Then, the operator depresses the feed switch (not shown) of the key inputting portion 121 (step 102), whereby the motor M' for driving the conveying means 111 and 115 starts to rotate, and a start signal is sent out to the computer 2 and also the count value signal of the counter 18b is sent out to the computer 2 to load the counter 12a (step 103), whereby the count values of the two counters 12a and 18b are brought into conformity to each other. When the photographing film has been interchanged, the operator depresses the clear key 18c of the counter 18b for photographing and sets the count value thereof to 0.

When the leading end edge of the object P to be photographed paid away by the rollers 111a and 111d is then detected by the sensor $S_4$, the reading of the bar code by the bar code scanner 12 is started and, if the bar code is read within a prescribed time (step 104), the data thereof is sent out to the computer 2 and stored in the memory means M and also the number of times of reading in the counter 12a for bar code is counted up by one (step 108). When the leading end edge of the object P to be photographed conveyed by the conveying means 115 is detected by the sensor $S_3$, the photographing of the image of the object P to be photographed is effected by the photographing camera 18, and the count value of the counter 18b is counted up by one (step 109).

On the other hand, if at the step 104, the bar code, is not read within the prescribed time, the reject solenoid 14 is energized to reject the object P to be photographed (steps 105 and 106) so that the photographing of such an object P to be photographed may not be effected. When this rejecting operation is terminated, the reject solenoid 14 is deenergized and the guide plate 13 is returned to its usual position (step 107).

If at the point of time whereat the photographing of the object P to be photographed has been finished, it is judged from the signal from the sensor $S_1$ that the objects P to be photographed are present on the paper supply tray 10, return is made to the step 104, where the above-described photographing operation is continued (step 110). On the other hand, if at step 110, it is judged that the objects P to be photographed are absent on the paper supply tray 10 and photographing has been finished, the motor M' is stopped (step 111) to thereby stop the driving of the conveying means 111 and 115, and the count values of the counter 18b and the counter 12b are compared with each other (step 112). If the two count values are in conformity to each other, a conformity signal (a normality signal) is sent out to the computer 2 and also the paper discharge tray driving mechanism 123 having a solenoid is operated to pivotally move the paper discharge tray 19, whereby the objects P supported on the tray 19 are moved onto the lower paper discharge tray 20 (step 114). Thus, in the computer 2, the bar code information and the address number transferred thereto between the start signal and the conformity signal when the conformity signal has been produced are determined as right index data corresponding to the object P to be photographed so that the data may not be erased.

On the other hand, when at step 112, inconformity occurs between the count values of the counters 12a and 18b, an inconformity signal (an abnormality signal) is sent out to the computer 2 (step 113). In this case, the bar code information and the frame number sent out between the start signal and the inconformity signal do not rightly correspond to the image of the object P to be photographed and therefore are determined as being wrong, and are erased from the memory means M. In such case, unlike the case where the aforementioned count values are in conformity to each other, the paper discharge tray 19 is not pivotally moved so that the objects P are left on the tray 19. Thus, the objects P whose right index data have been prepared and the objects P whose index data have not yet been prepared do not mix together on the paper discharge tray 20 and therefore, the operator can again set the objects P on the paper discharge tray 19 onto the paper supply tray 10 and carry out the photographing thereof without carrying out a cumbersome process.

If at step 102, the mode 2 is selected, the rejection of the object P to be photographed is not effected when the bar code is not read at step 104, and a signal to the effect that reading is impossible is sent out to the computer 2 and further, the counter 12a is counted up by one and advance is made to step 109. Thus, again in the mode 2, as in the case of the mode 1, index data corresponding to the images of the film can be obtained.

In the above-described embodiment, the read bar code information and the corresponding frame number are directly transferred to the memory means, but alternatively, an intermediate memory may be provided in the control circuit 22 or the computer 2 so that index data comprising the read bar code information and the corresponding frame number may be temporarily stored in the intermediate memory and when a conformity signal is output, the index data stored in the intermediate memory may be transferred to and stored in the memory means M in the computer 2 and the data in the intermediate memory may be erased. In this case, if an inconformity signal is output, the index data stored in the intermediate memory may be erased without being transferred to the memory means M. Thereby, the intermediate memory can be of a small capacity.

The inconformity signal is produced in the following cases: when conveyance abnormality occurs as when for example, an object P to be photographed falls off the conveyance path between the reading unit R and the recording unit C or when a plurality of objects to be photographed which have been in the sequence feed or double feed condition in the reading unit R are separated one by one during the conveyance to the recording unit C, or when some abnormality of the apparatus occurs as when the solenoid 14 is energized by mistake although bar codes have been rightly read or when the bar code information read by the scanner 12 is not rightly transferred to the computer 2.

Also, in the above-described embodiment, the comparison between the counters 18b and 12a is effected when the sensor $S_1$ detects the absence of the object to be photographed, but alternatively, the comparison between the counters 18b and 12a may be effected when the counter 12a for counting the number of times of photographing assumes a preset value.

Also, it is unnecessary to set the number of times of photographing in advance as in the prior art, and the photographing of images and the preparation of index data can be accomplished by only placing the objects P to be photographed on the paper supply tray 10 and effecting the simple operation of the key inputting portion 121 and therefore, the efficiency of work can be improved greatly.

Further, the counter 18b for counting the number of times of photographing is a mechanical counter and therefore, if this counter 18b is reset when a new film is set, the absolute address on the film can be input to the computer 2 and moreover, this counter 18b is not cleared by the power source being cut off and therefore, in the computer 2, irrespective of the ON or OFF of the power source, data base can be prepared by making the bar code information successively sent thereto correspond to this absolute address. Accordingly, it is not necessary to change the address in the computer 2 after the bar code information is input, and it becomes possible to perform the subsequent searching work easily.

In the case of the present embodiment, the design is made such that the comparison between the number of read bar codes and the number of photographed objects P is effected in the control circuit 22 of the image recording apparatus, whereas the present invention is not restricted thereto, but the design may be made such that such comparison is effected in the computer 2.

According to the above-described embodiment, only when the count values in the first and second counting means coincide with each other, the code information sent out to the outside processing apparatus is made effective and therefore, it is not necessary to stop the operation once at a point of time whereat the recording and reading of a predetermined number have been finished to check up the code information and as a result, it becomes unnecessary to set and input this number in advance and it becomes possible to simplify the recording and reading operations and improve the efficiency of work greatly.

Figure 14:
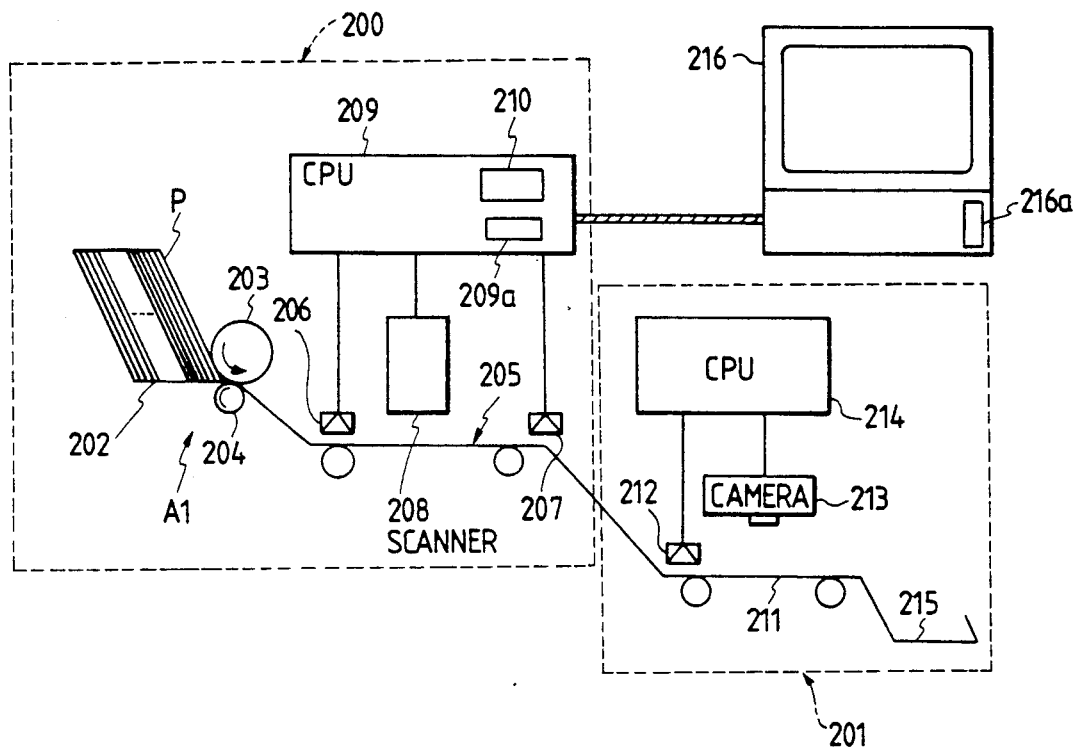
FIG. 14 is a diagram showing the construction of still another embodiment of the present invention.

FIG. 14 shows still another embodiment of the present invention which comprises an information reading apparatus 200, a photographing apparatus 201 and a personal computer 216 having a memory 216a as an information accumulating device. This system automatically reads the bar code information on an original P during the photographing of the original P and causes the code information and frame number as the index data of the original P to be stored in the personal computer 216, thereby preparing the index at a high speed during photographing without resorting to a hand. A conventional memory such as a floppy disk, an optical disk or a magnetic tape can be used as the memory 216a.

The information reading apparatus 200 is comprised of a feeding unit A1 for originals P, and a reading conveyance path 205 provided with a scanner 208 as reading means.

Figure 15:
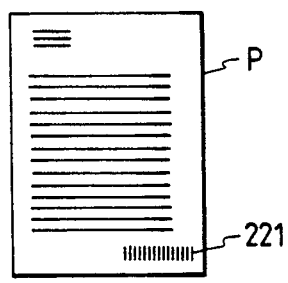
FIG. 15 is a plan view showing bar codes on an original.

The original P has a bar code 221 attached to a part thereof, as shown in FIG. 15, and this bar code 221 is read by the scanner 208. This bar code 221 comprises various kinds of information of the originals P, and discriminates between the originals P.

The original feeding unit Al is comprised of a stacker 202 for supporting a number of originals P thereon, and a paper feeding roller 203 and a separating roller 204 for feeding the originals P supported on the stacker 202 one by one.

The reading conveyance path 205 is driven by a driving mechanism such as a motor, not shown, and halfway of this conveyance path 205, the scanner 208 is disposed in predetermined spaced apart relationship with the conveyance surface. An original supply sensor 206 for detecting the leading end edge of the original P is disposed at the entrance of the reading conveyance path 205. On the other hand, at the exit of the reading conveyance path 205, there is disposed an original discharge sensor 207 as detecting means for detecting that the original P has been completely discharged from the reading conveyance path 205.

This reading conveyance path 205 is connected to the entrance of the photographing apparatus 208, and the originals P discharged from the reading conveyance path 205 are continuously supplied to the photographing apparatus 201. The original supply sensor 206, the scanner 208 and the original discharge sensor 207 are connected to a CPU 209 as control means, which in turn is connected to the personal computer 216.

On the other hand, the photographing apparatus 201 has a photographing conveyance path 211, and a camera 213, such as photographing means is disposed halfway of this photographing conveyance path 211. A photographing sensor 212 for detecting the originals P is provided at the entrance of the photographing conveyance path 211. This sensor 212 and the camera 213 are connected to a CPU 214 for controlling photography.

The operation of the above-described photographing system will now be described.

First, the originals P supported on the stacker 202 are fed one by one to the reading conveyance path 205 by the paper feeding roller 203 and the separating roller 204. The original P passes the original supply sensor 206 and the bar code 221 on the original P is read by the scanner 208 on the basis of the passage signal. The content of the thus read bar code is transferred to the CPU 209 and temporarily preserved in a memory 209a in the CPU 209.

When the trailing end edge of the original P has passed the original discharge sensor 207, the bar code information preserved in the memory 209a in the CPU 209 is transferred to a memory 216a in the personal computer 216.

If the original P does not pass the original discharge sensor 207 even when a time necessary and sufficient for the original P to pass the original supply sensor 206 and pass the original discharge sensor 207 has elapsed, the CPU 209 regards it as the jam of the original between the original supply sensor 206 and the original discharge sensor 207, and even if the bar code information is preserved in the memory in the CPU 209, the CPU 209 does not transfer that information to the personal computer 216 but erases that information, and treats the jam.

Figure 16:
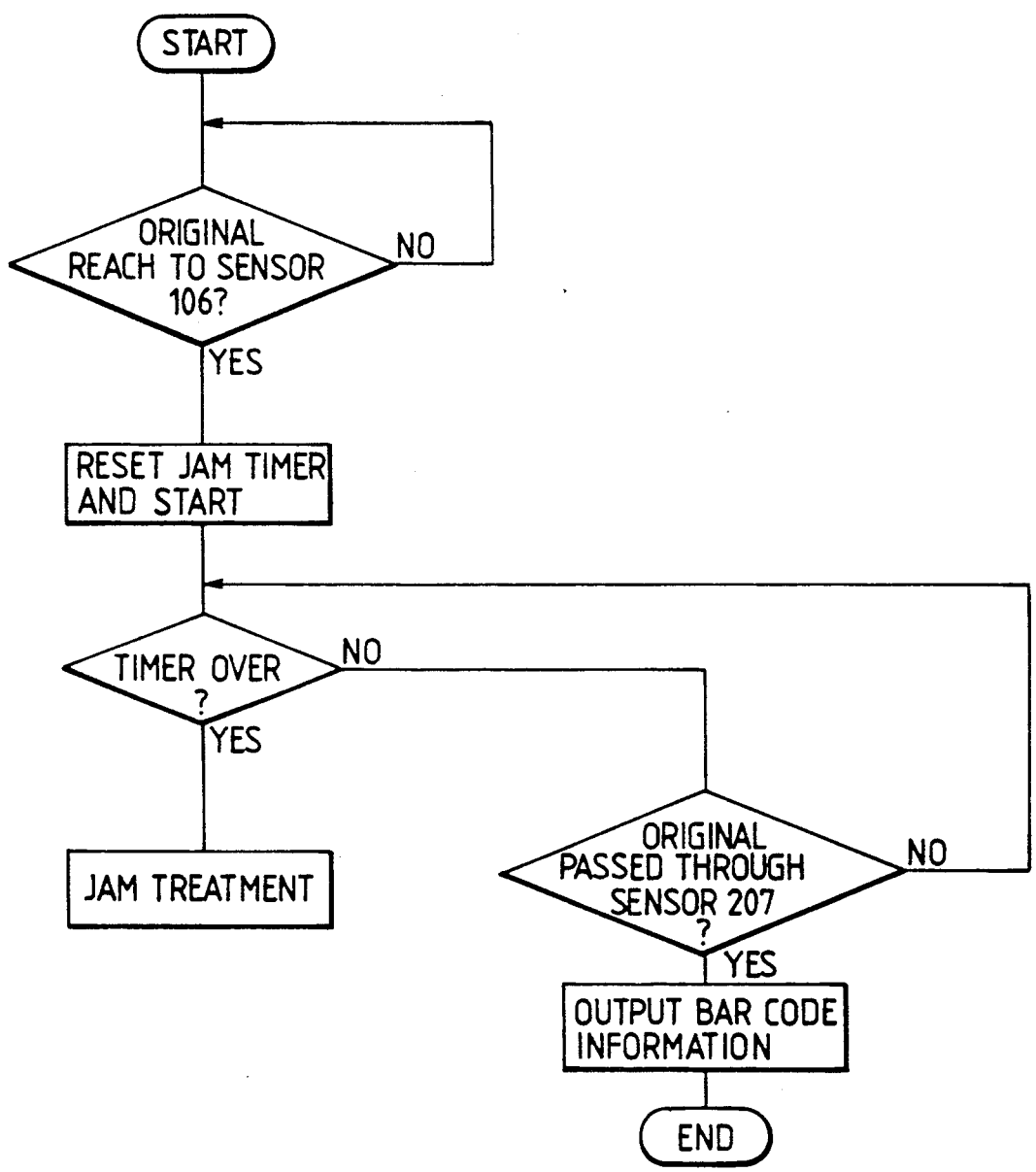
FIG. 16 is a flow chart of the control in the embodiment of FIG. 14.

The control of this jam treatment will now be described in detail. As shown in FIG. 16, a timer 210 in the CPU 209 is adapted to be reset and started at the stage whereat the original P has passed the original supply sensor 206.

By the timer 210 experiencing the lapse of said necessary and sufficient time, or by the trailing end edge of the original P passing the original discharge sensor 207 before that, it is judged whether the conveyance abnormality of the original P (the jam or the like of the original) has occurred. That is, if the output of the original discharge sensor 207 changes over by the time when the timer 210 has experienced the lapse of said necessary and sufficient time, the bar code information temporarily preserved in the memory 209a in the CPU 209 is output and accumulated as index data in the memory 216a in the personal computer 216.

On the other hand, if the timer 210 experiences the lapse of said necessary and sufficient time before the output of the original discharge sensor 207 changes over, the bar code information temporarily preserved in the memory 209a in the CPU 209 is erased and is not transferred to the personal computer 216.

On the other hand, if the original P is smoothly conveyed along the reading conveyance path 205 without being jammed, the original P is fed from the exit of the reading conveyance path 205 to the photographing apparatus 201, and when the photographing sensor 206 detects the original P, the CPU 214 produces a photographing signal to the camera 213, and the original P is photographed by the camera 213, whereafter it is discharged onto the paper discharge stacker 215.

In the present embodiment, the index information on the original P is a bar code, but even in the case of OCR, MICR or the like, the scanner portion may be made into reading means adapted therefor, whereby a similar system can be constituted by a construction similar to that of the present embodiment.

The information to be read is not limited to such index information, but the present invention is also applicable to an apparatus for reading image information, and in short, it can be widely applied to a reading apparatus provided with a reading conveyance path.

As described above, in the present embodiment, only when the original has been normally discharged from the reading conveyance path, the read information thereof is output and therefore, when abnormality (such as the jam of the original occurs in the reading conveyance path, the restoration process thereof can be accomplished simply by a treatment in the apparatus such as the removal of the jammed original and thus, the process can be accomplished easily. Also, where the apparatus is systematized with an outside instrument such as a personal computer, there can be realized an apparatus which has little influence upon the outside instrument and which is high in independency.

Figure 17:
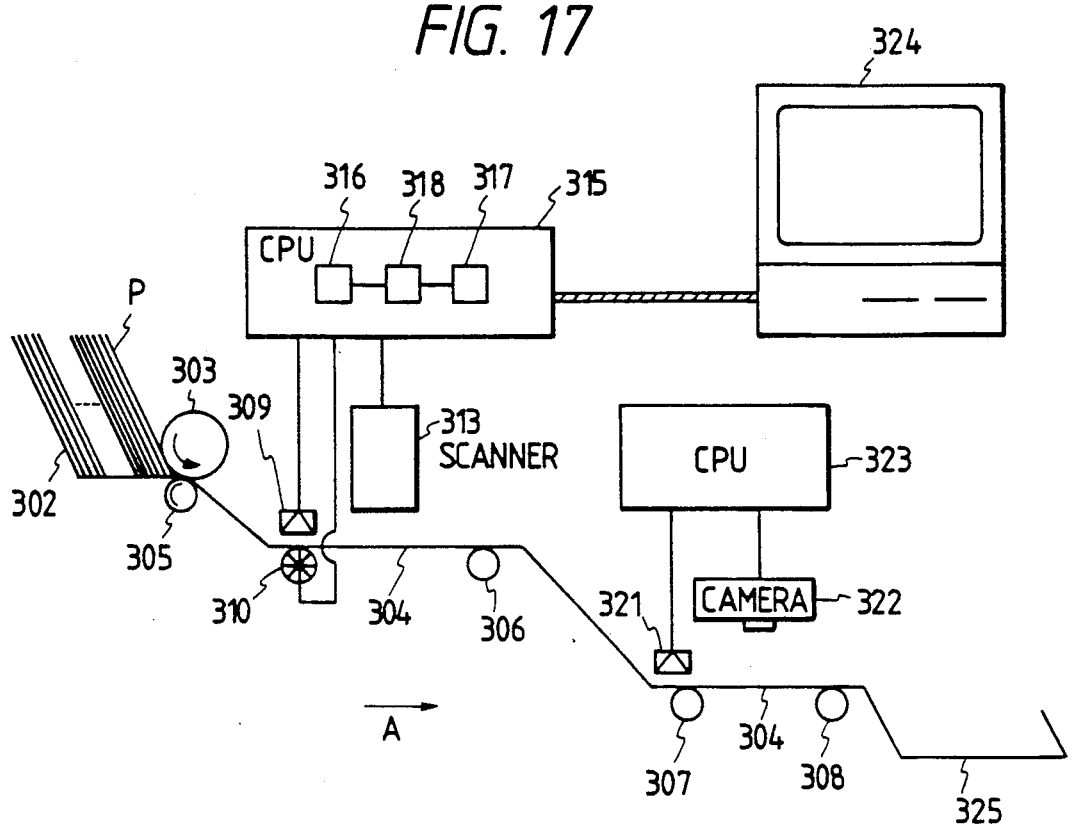
FIG. 17 is a diagram showing the whole of still another embodiment of the present invention.

FIG. 17 shows yet still another embodiment of the present invention. A number of originals P are supported and set on a stacker 302. The originals P are conveyed one by one toward a conveyance path 304 by a paper feeding roller 303. At this time, separation of the originals P is effected by a separating roller 305 so that the originals P may not be fed in their superposed state. This separating roller 305, the paper feeding roller 303 and conveying rollers 306, 307, 308 are rotated by the drive of a motor, not shown, to thereby convey the originals P in the direction of arrow A on the conveyance path 104. The leading end edge of the original P fed out from the stacker 302 is detected by a sensor 309.

An encoder 310 as measuring means is provided in the conveyance path 304, and is rotated in synchronism with the conveyance of the original P and generates a pulse. The original P which has passed the sensor 309 has its bar code read by a bar code scanner 313 provided on the conveyance path 304. This bar code scanner 313 and the sensor 309 are connected to a CPU 315 for controlling the apparatus. In the CPU 315, there are provided a memory 316 for converting the length of an original P in the direction of conveyance into the count number of the pulse of the encoder 310 and storing and setting it, a counter 317 for counting the pulse of the encoder 310 for each original P, and a comparator 318 for comparing the count number set by the memory 316 with the count number of the counter 317.

The original P which has passed the bar code scanner 313 has its leading end edge detected by another sensor 321, and the image of the original P is photographed by a camera 322 and recorded on a microfilm, not shown. The sensor 321 and the camera 322 are controlled by another CPU 323.

The information of the bar code 312 read by the bar code scanner 313 is sent out to a computer 324 as an outside processing apparatus through the CPU 315 and accumulated in a memory in the computer 324.

The accumulated bar code information is utilized as index data belonging to each original P. That is, a frame mark is attached, for example, to the upper side or the lower side of each image frame of a microfilm (the portion on which each of said originals is photographed), and when the thus prepared microfilm is to be searched for by a separate microfilm reader, the necessary image frame is searched for by counting these frame marks. Thus, each image frame has an absolute address indicative of the order of that image frame from the end of the microfilm by the counting of the frame marks.

However, when effecting the search, it is desirable for the searcher to effect the search by the index arranged by himself (this is not directly related to the aforementioned absolute address). Therefore, it is necessary that said index and said absolute address be accumulated as a relating data base. The index information by said bar code is used for this relating, and the accumulation thereof is effected in the computer 324. Accordingly, the searcher uses the computer 324 to access to the data base by the index related and arranged by himself, extracts from this data base an absolute address corresponding to said index information, and effects the search for the information in the aforementioned microfilm reader on the basis of the extracted absolute address.

Thus, in the present embodiment, the work of preparing the index data for relating the absolute address with the index is done when the bar code on the original P is automatically read during the photographing of the original P and is accumulated in the computer 324 for use as a data base. A microfilm photographing automatic index preparing system to which the present embodiment is applied can accomplish said index at a high speed without the intermediary of a hand.

The operation of the present embodiment will hereinafter be described.

The apparatus is first set to a mode for setting the length of the original P. Only one of the originals P to be photographed is then fed out from the stacker 302 by the paper feeding roller 303. From when this original P has arrived at the sensor 309, the counter 317 of the CPU 315 begins to count the pulse generated by the encoder 310, and stops counting when the original has passed the sensor 309. The then count number represents the length of this original P. With the error or the like of the encoder 310 being taken into account, said count number 0 (0 being positive) is stored as a set value in the memory 316. This original P can also be intactly conveyed and photographed.

The ordinary photographing after said set value has been set will now be described.

Figure 18:
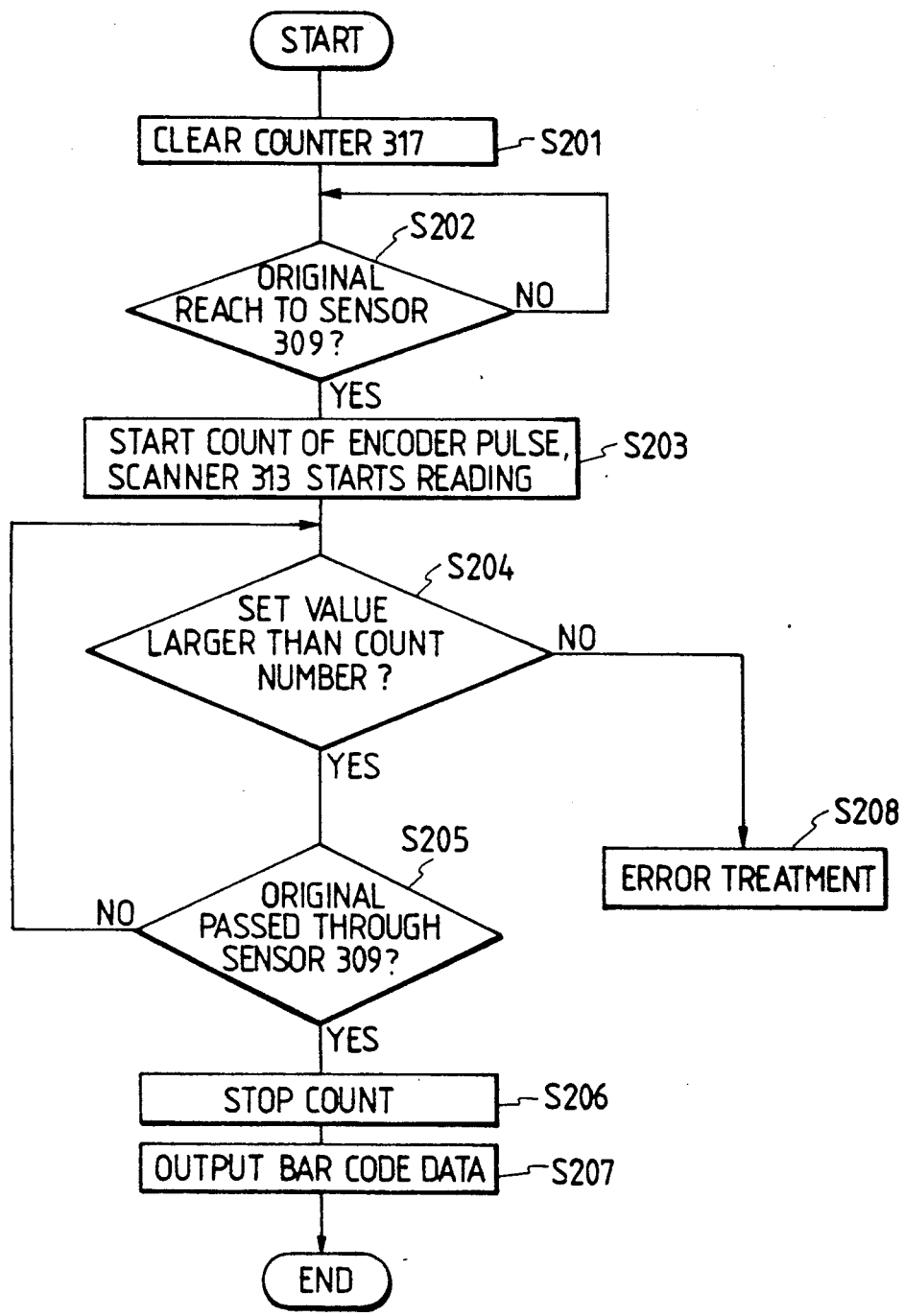
FIG. 18 is a flow chart showing the operation control of the embodiment of FIG. 17.

The apparatus is first changed over to the photographing mode. The originals P supported on the stacker 302 are separated by the separating roller 305 and fed out one by one by the paper feeding roller 303. As shown in FIG. 18, the CPU 315 has cleared the counter 317 by this time (step 201), and when the leading end edge of the original P has reached the sensor 309 (step 202), the CPU 315 causes the counter 317 to begin to count the pulse generated by the encoder 310 (step 203).

At the same time, the CPU 315 produces a reading start signal to the bar code scanner 313, which thus reads the bar code on the original P. Before the count number of the counter 317 exceeds the set value (step 204), if the original P passes the sensor 309 (step 205), it is judged that sequence feed has not occurred and the counting is stopped (step 206), and the information read by the bar code scanner 313 is transmitted to the computer 324 (step 207). Thereafter, the original P further passes another sensor 321 and is photographed and recorded on a microfilm by the camera 322. The thus photographed original P is discharged onto the paper discharge stacker 325.

If at step 204, the count number of the counter 317 exceeds the set value before the original P passes the sensor 309, it is judged that sequence feed has occurred and the data regarding the bar code read by the bar code scanner 313 is not transmitted to the computer 324, but at step 208, error treatment is carried out. Thereby, relating of a wrong absolute address with the index can be prevented in the computer 324. Particularly, it is usual that this absolute address is the number given to the conveyed originals P in the order of arrival, and the absolute addresses of the succeeding originals P can be prevented from becoming wrong one by one. In this case, as the error treatment, for example, the original conveying motor is stopped so that the original P may not be conveyed to the photographing position, or the photographing of the original P is inhibited.

Figure 19:
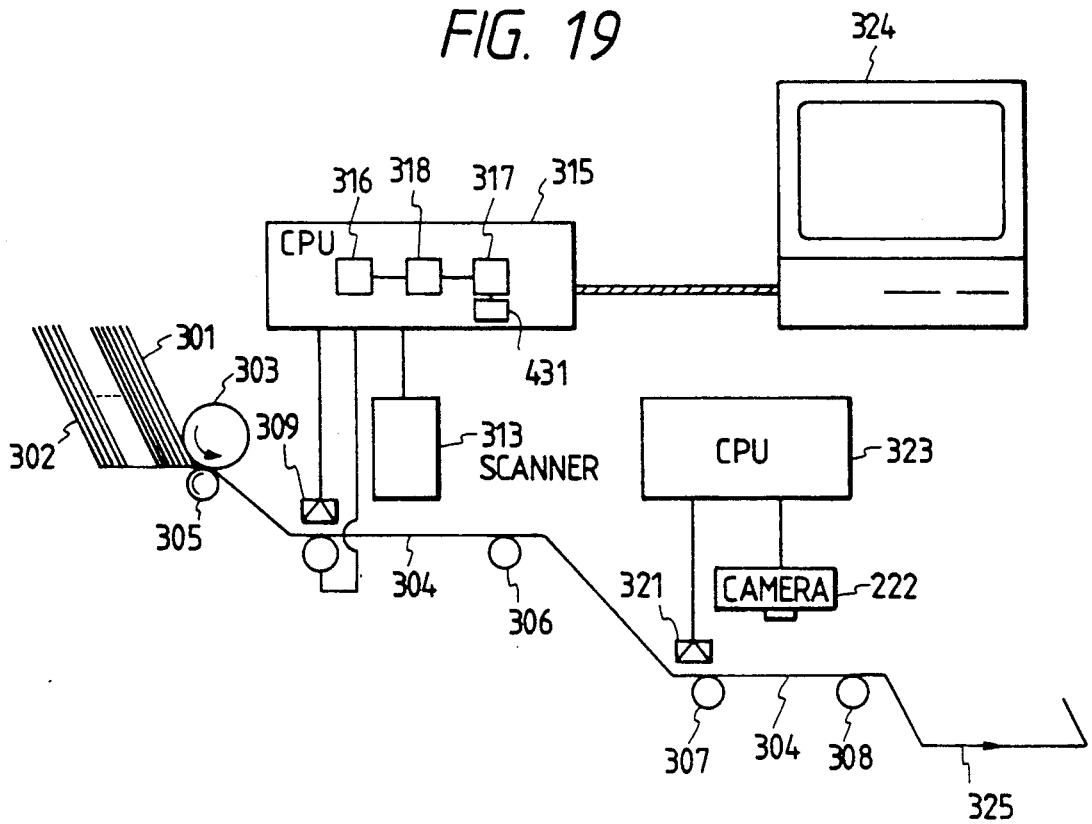
FIG. 19 is a diagram showing the whole of another embodiment of the present invention.
Figure 20:
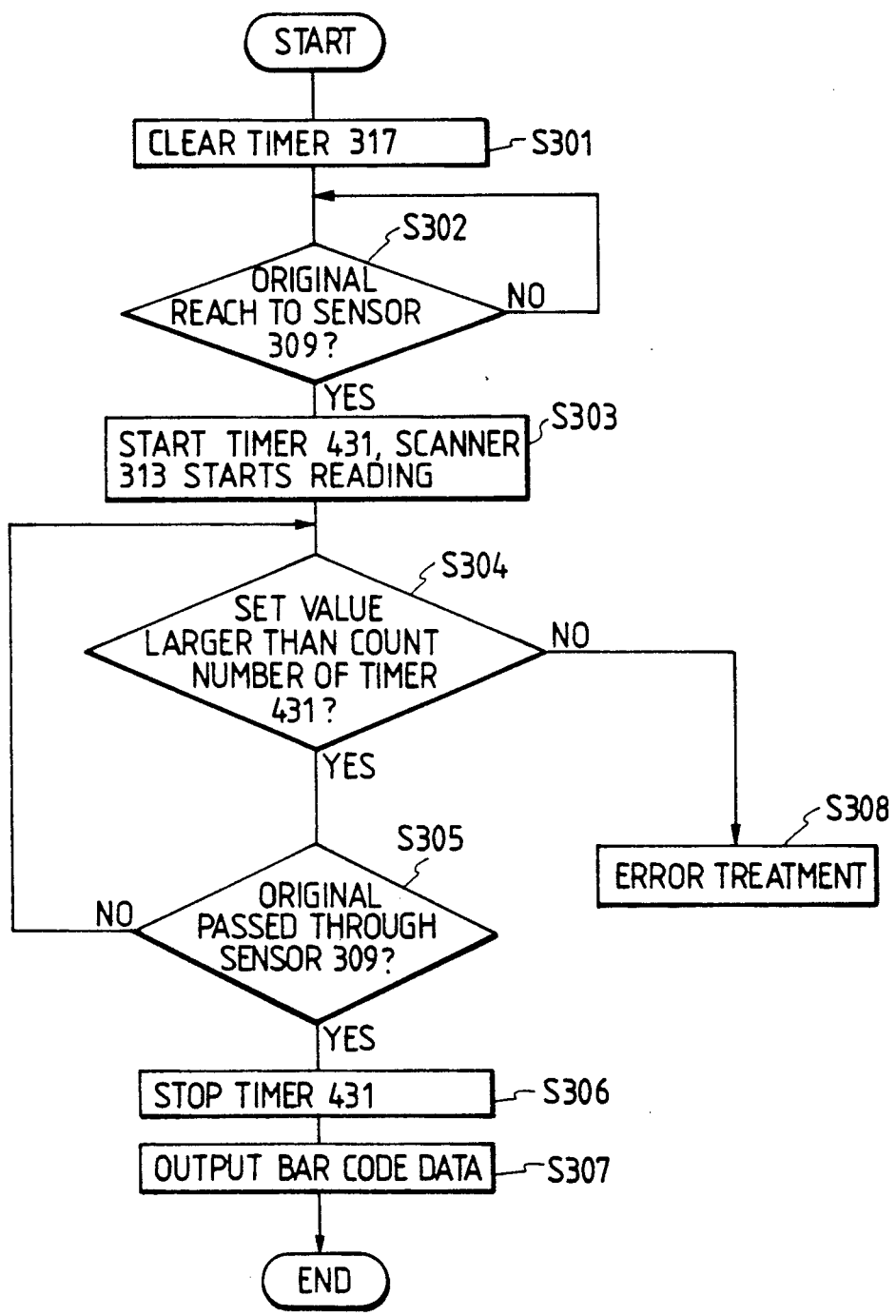
FIG. 20 is a flow chart showing the operation control of the embodiment of FIG. 19.

Another embodiment of the present invention is shown in FIGS. 19 and 20. This embodiment also is applied to an image recording apparatus similar to the previous embodiment. In this embodiment, portions similar to those in the previous embodiment are given similar reference numerals and need not be described.

The difference of the present embodiment from the embodiment of FIG. 17 is that the encoder 310 is not provided and instead, a timer 431 is provided as measuring means. That is, as shown in FIG. 19, the length of the original P in the direction of conveyance is measured as the time required for the original P to reach and pass the sensor 309, i.e., the count number of the timer 431 (step 305), and the set value set in the memory 316 is also set as the count value of the timer 431 (step 304). That is, the length of the original P in the direction of conveyance is proportional to the time required for the original P to reach and pass the sensor 309 and therefore, by accurately counting this time, an entirely similar effect can be obtained even if the encoder 310 is not used as in the previous embodiment.

Figure 21:
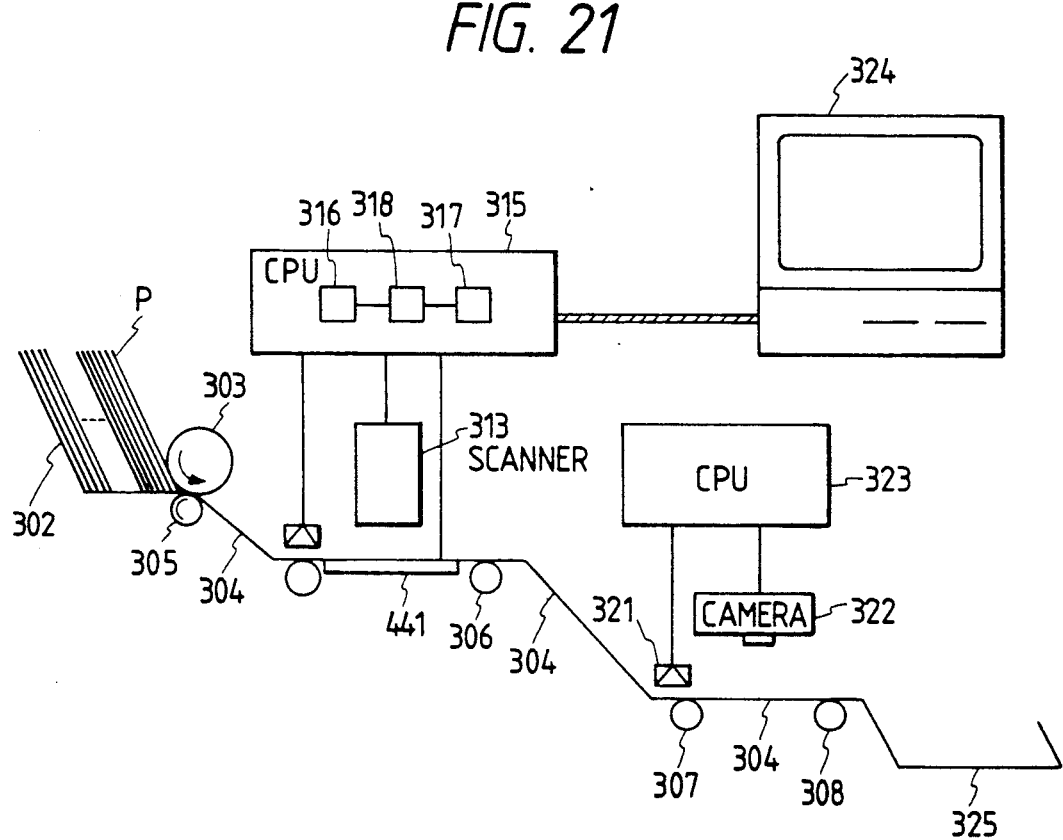
FIG. 21 is a diagram showing the whole of another embodiment of the present invention.

Another embodiment of the present invention is shown in FIGS. 21 and 22. The difference of this embodiment from the embodiment of FIG. 17 is that as shown in FIG. 21, the measuring means for measuring the length of the original P is not the encoder 310 (see FIG. 17), but a transmitting type CCD 441 provided on the opposite side of the conveyance path 304 with respect to a light source, not shown, and connected to the CPU 315. Thus, the length of the original P can be measured by the number of the cells of the CCD 441 which are shield from light from the light source by the original P when the original P has come onto the CCD 441. That is, when as shown in FIG. 22, the leading end edge of the original P is conveyed onto the CCD 441 (step 401), the CPU 315 sends out a reading start signal to the bar code scanner 13 (step 402) and causes the bar code scanner to read the bar code on the original P, and when the whole of the original P from its leading end edge to its trailing end edge is positioned on the CCD 441 (step 403), the number of the cells of the CCD 441 which are shielded from the light from the light source by the original P is measured (step 404).

If this measured number is smaller than a number stored as a set value in advance (step 405), it is judged that sequence feed has not occurred, and the information read by the bar code scanner 313 is transmitted to the computer 324 (step 406). On the other hand, if at the step 405, the aforementioned measured value is greater than said set value, it is judged that sequence feed has occurred, and said transmission is not effected but error treatment is carried out (step 407). Thus, the use of the CCD 441 instead of the encoder can also obtain an effect similar to that of the previous embodiment.

In the above-described three embodiments, when the measured length of the original P is greater than the set length, it is judged that sequence feed has occurred, and the data of the bar code which is the read information is not output to the computer 324, but in the other embodiments, the reading itself of the bar code may be discontinued.

We claim:

1. An image recording apparatus having:
   reading means for reading information for discriminating between originals;
   recording means for recording the images of the originals on a recording medium;
   conveying means for conveying the originals to said reading means and to said recording means where the images of the originals are recorded on the recording medium;
   detecting means for detecting the state of conveyance of the originals conveyed by said conveying means;
   data preparing means for preparing index data on the basis of the information read by said reading means; and
   control means for controlling the preparation of the data by said data preparing means in conformity with the state of conveyance of the originals detected by said detecting means.

2. An image recording apparatus according to claim 1, wherein said control means corrects the index data of said data preparing means in conformity with the state of conveyance of the originals.

3. An image recording apparatus according to claim 1, wherein said data preparing means has memory means for storing the index data therein, and said control means erases the index data stored in said memory means in conformity with the state of conveyance of the originals.

4. An image recording apparatus according to claim 1, wherein said data preparing means has memory means for storing the index data therein, and said control means inhibits the storage of the index data into said memory means in conformity with the state of conveyance of the originals.

5. An image recording apparatus according to claim 2, wherein said detecting means outputs an abnormality signal when the originals are conveyed in superposed relationship with each other, and said control means inhibits the preparation of the index data by said data preparing means in accordance with said abnormality signal.

6. An image recording apparatus according to claim 2, wherein said detecting means outputs an abnormality signal when the originals are jammed in a path, and said control means controls said data preparing means by said abnormality signal.

7. An image recording apparatus according to claim 1, further having conveyance control means for controlling said conveying means so that when detecting means detects the conveyance abnormality of the originals, the originals having caused the conveyance abnormality may not be conveyed to said recording means.

8. An image recording apparatus according to claim 7, wherein said conveyance control means includes changing-over means for changing over to a first path for conveying the originals to said recording means and a second path for not conveying the originals to said recording means.

9. An image recording apparatus according to claim 1, further having a memory for temporarily preserving the information read by said reading means and wherein said control means transfers the information preserved in said memory to said data preparing means when said detecting means detects the normal state of conveyance of the originals.

10. An image recording apparatus according to claim 9, wherein said data preparing means includes memory means for preserving the transferred information as index data.

11. An image recording apparatus according to claim 10, wherein said detecting means detects that the originals are conveyed normally when the originals pass said recording means.

12. An image recording apparatus according to claim 1, wherein said detecting means includes first counting means for counting the number of times over which said reading means has read the information, second counting means for counting the number of times over which said recording means has recorded the images of the originals on the recording medium, and comparing means for comparing the values of said first and second counting means to thereby judge the conveyance abnormality of the originals.

13. An image recording apparatus according to claim 1, wherein said information for discriminating between originals is code information.

14. An image recording apparatus according to claim 13, wherein said code information is bar codes attached to the originals.

15. An image recording apparatus according to claim 1, wherein said index data comprises the information read by said reading means, and the address of the original in the recording medium on which the original corresponding to said information is recorded by said recording means.

16. An image recording apparatus according to claim 1, further having a first tray for receiving the originals conveyed by said conveying means, a second tray for receiving the originals piled on said first tray, and means for moving the originals piled on said first tray onto said second tray.

17. An image recording apparatus according to claim 16, wherein said moving means is driven in conformity with the state of conveyance of the originals detected by said detecting means.

18. An image recording apparatus according to claim 1, wherein said reading means is a scanner for scanning said information.

19. An image recording apparatus having reading means for reading information for discriminating between originals, recording means for recording images of the original on a recording medium, conveying means for conveying the original to said reading means and said recording means, detecting means for detecting state of conveyance of the original conveyed by said conveying means, data preparing means for preparing an index data on the basis of the information read by said reading means, and control means for controlling said recording means, said conveying means and said data preparing means, characterized in that:

when said detecting means detects abnormal conveyance of the original, said control means controls said recording means so that the original subject to the abnormal conveyance is not recorded, and controls said conveying means so that the original subject to the abnormal conveyance is conveyed to a first tray while the original not subject to the abnormal conveyance is conveyed to a second tray.

* * * * *

UNITED STATES PATENT AND TRADEMARK OFFICE
CERTIFICATE OF CORRECTION

PATENT NO. : 5,132,808
DATED : July 21, 1992
INVENTOR(S) : Hirokazu Higuchi, et al It is certified that error appears in the above-indentified patent and that said Letters Patent is hereby corrected as shown below:

COVER PAGE

Under [56] References Cited, under "Foreign Patent Documents", please insert:

--2734371   7/1973   Fed. Rep. of Germany
  2001791   2/1979   United Kingdom--

COLUMN 8

Line 26, "(bar code data) 12" should read --(bar code data) 112--.

Signed and Sealed this

Fifth Day of October, 1993

Attest:

BRUCE LEHMAN

Attesting Officer    Commissioner of Patents and Trademarks